United States Patent
Pierson

(10) Patent No.: US 9,577,955 B2
(45) Date of Patent: Feb. 21, 2017

(54) INDEFINITELY EXPANDABLE HIGH-CAPACITY DATA SWITCH

(71) Applicant: Forrest Lawrence Pierson, Dallas, TX (US)

(72) Inventor: Forrest Lawrence Pierson, Dallas, TX (US)

(*) Notice: Subject to any disclaimer, the term of this patent is extended or adjusted under 35 U.S.C. 154(b) by 373 days.

(21) Appl. No.: 14/021,563

(22) Filed: Sep. 9, 2013

(65) Prior Publication Data

US 2014/0269738 A1 Sep. 18, 2014

Related U.S. Application Data

(60) Provisional application No. 61/778,393, filed on Mar. 12, 2013.

(51) Int. Cl.
*H04L 12/933* (2013.01)
*H04L 12/931* (2013.01)

(52) U.S. Cl.
CPC ............ *H04L 49/101* (2013.01); *H04L 49/35* (2013.01)

(58) Field of Classification Search
CPC .... H04L 1/0083; H04L 1/22; H04L 29/12018; H04L 29/12028; H04L 41/04; H04L 45/00; H04L 45/04; H04L 45/10; H04L 45/16; H04L 45/54; H04L 45/74; H04L 47/50; H04L 47/622; H04L 47/625; H04L 49/10; H04L 49/15; H04L 49/1507; H04L 49/1515; H04L 49/1516; H04L 49/3018; H04L 49/3027
See application file for complete search history.

(56) References Cited

U.S. PATENT DOCUMENTS

| | | | | |
|---|---|---|---|---|
| 5,022,025 | A * | 6/1991 | Urushidani et al. | 370/422 |
| 5,477,536 | A * | 12/1995 | Picard | 370/400 |
| 6,594,229 | B1 | 7/2003 | Gregorat | |
| 7,002,908 | B1 * | 2/2006 | Lund et al. | 370/228 |
| 7,327,760 | B1 * | 2/2008 | Parruck et al. | 370/474 |
| 7,352,745 | B2 * | 4/2008 | Perera et al. | 370/389 |
| 7,616,646 | B1 * | 11/2009 | Ma et al. | 370/401 |

(Continued)

OTHER PUBLICATIONS

PCT Search Report dated Sep. 10, 2014, for PCT/US14/20089 filed Mar. 4, 2014.

(Continued)

*Primary Examiner* — Gary Mui
*Assistant Examiner* — Stephen Steiner
(74) *Attorney, Agent, or Firm* — NK Patent Law, PLLC

(57) ABSTRACT

A data switch for a packet data switch includes switching nodes connected to each other in an interconnecting matrix, providing a multiplicity of data paths between an incoming data or telecom port and an outgoing data or telecom port of the data switch. The interconnecting switching nodes can achieve high capacity data switching by providing a partial switching solution at each node, distributing the switching load. A switching protocol for interconnecting switching nodes allows data packets to be selectively passed from any incoming port on an interconnecting switch node to any interconnecting switching node or outgoing port connected to it. In at least one example, the switching protocol has mechanisms in it to provide for the duplicating of the contents of the data packet and pass them to multiple interconnecting switching nodes or outgoing ports.

20 Claims, 11 Drawing Sheets

(56) References Cited

U.S. PATENT DOCUMENTS

| | | | |
|---|---|---|---|
| 2002/0080790 A1* | 6/2002 | Beshai | 370/392 |
| 2003/0012179 A1 | 1/2003 | Yano et al. | |
| 2003/0048781 A1 | 3/2003 | Pierson | |
| 2004/0032856 A1 | 2/2004 | Sandstrom | |
| 2006/0023640 A1* | 2/2006 | Chang et al. | 370/254 |
| 2007/0147364 A1* | 6/2007 | Palacharla et al. | 370/389 |
| 2007/0248115 A1* | 10/2007 | Miller et al. | 370/466 |
| 2008/0219254 A1 | 9/2008 | Haney | |
| 2008/0301537 A1* | 12/2008 | Isono | 714/807 |
| 2009/0154475 A1* | 6/2009 | Lautenschlaeger | 370/400 |
| 2009/0201909 A1* | 8/2009 | Bou-Diab et al. | 370/351 |
| 2011/0317559 A1* | 12/2011 | Kern et al. | 370/235 |
| 2012/0147744 A1 | 6/2012 | Lee | |
| 2012/0271961 A1 | 10/2012 | Alshinnawi et al. | |
| 2012/0287926 A1* | 11/2012 | Anantharam et al. | 370/355 |

OTHER PUBLICATIONS

Form PCT/IB326 dated Sep. 24, 2015 for PCT Application No. PCT/US2014/020089.
Form PCT/IB373 (Written Opinion) dated Sep. 15, 2015 for PCT Application No. PCT/US2014/020089.

* cited by examiner

INDEFINITELY EXPANDABLE HIGH-CAPACITY DATA SWITCH

CROSS REFERENCE TO RELATED APPLICATION

This application claims the benefit of priority of U.S. provisional patent application No. 61/778,393, titled "INDEFINITELY EXPANDABLE HIGH-CAPACITY DATA SWITCH," filed on Mar. 12, 2013, which is incorporated herein in its entirety by this reference.

TECHNICAL FIELD

The present disclosure relates to data communication. More particularly, the present disclosure relates to an expandable high capacity data switch.

BACKGROUND

Traditional data switches would gather all input signals into a single, centralized switching engine, or a few scattered switching engines. Each switching engine would accept traffic for those outputs it services. The bandwidth of the switching engines is limited. This limits the port capacities to at most several hundred to a few thousand ports of 10 Giga bits per second each. As such, when the capacity of a data center exceeds the ability of such a switch to handle all of its traffic, multiple switches are needed to handle the traffic demands of the data center. As traffic entering the data center on one switch may have to exit on another data switch, a multiplicity of ports on each switch are dedicated to interconnecting the switches together. This consumes expensive resources and makes switching more expensive per data packet for data centers that are too large for one data switch.

A particular known switching architecture is the shared bus architecture. It is used extensively in the industry today, for example, in the Cisco® Catalyst® 6500 family of data switches. The shared bus architecture has been in use for over twenty years. Data switches based on the PCI bus, which is a form of a shared bus architecture, have been around close to the inception of the PCI bus in 1993. In the shared bus architecture, all incoming data traffic is presented to a common data bus where all outgoing ports may accept a data packet placed on this shared bus. Incoming data traffic ports will arbitrate with each other for access to the shared bus. Once granted access, the incoming data packet will be placed on the bus and the outgoing port or ports that are to accept the traffic are notified that they are to do so. The limitations of the shared bus architecture are several. At most, one data packet can be transferred in a predefined period of time, limiting the number of packets that can pass through the shared bus architecture in one second. State of the art of technology precludes being able to transfer data packets more frequently than what the technology can handle. As technology improves, the predefined periods of time can be made smaller, allowing more packets to pass through the shared bus over the same one second period of time. However, improvements in technology are not able to keep pace with the rate of increase in network traffic. Another limitation of the shared bus architecture is that all data packets must pass through it, limiting the size and scope of any data switch built around it, as they have to be physically close to the actual implementation of the shared bus architecture.

A method of getting around the limitations of the shared bus architecture is the use of a multi-node bus, each with their own internal switching capability. The Advanced Switching Interconnect (ASI) is an architecture that uses multiple switching nodes connected to multiple data sources and data destinations. ASI passes data packets from a data source to a data destination by advancing the data packet from switching node to switching node, using information in the header of the data packet to determine which outgoing port on each node an incoming packet must go to. ASI uses physical addresses when a packet advances from node to node. Multiple packets may concurrently pass through the ASI architecture. However, ASI uses a relative address, not an absolute address. ASI's claim to fame is its ability to go in both directions when a packet traverses across a network made of ASI switching engines. It does so by entering an ASI switching engine on a port, and through the use of a header value, will count in a clockwise direction by the indicated number of ports over to exit the ASI switching node. It then advances the header value by the number of bits needed to count ports and get through each ASI switching node. At the destination, the packet is analyzed, and a new packet is generated utilizing the same header but with the direction bit changed. When going in the reverse direction the header value counts backwards, and as a packet enters each ASI switching node, it counts ports in a counter-clockwise direction until it reaches the original packet source. ASI lacks many features needed for high capacity switching, however. It does not have redundancy built into it, it does not have queuing (that is, the ability to pass higher priority packets before passing lower priority packets), packet duplication, or the buffering needed for data to enter and leave on all ports concurrently under all combinations of inputs and outputs. Further, ASI requires that the source and destination processors understand the ASI network when passing data packets through it. To qualify for a network data switch, the architecture of the data switch must be transparent to the end users. To qualify as a layer 2 data switch all the end user needs to do is provide a logical address of its destination and let the switch and the network the switch is in figure out how to route the data packet.

SUMMARY

This Summary is provided to introduce in a simplified form concepts that are further described in the following detailed descriptions. This Summary is not intended to identify key features or essential features of the claimed subject matter, nor is it to be construed as limiting the scope of the claimed subject matter.

At least one embodiment provides a novel architecture for a data switch that is able to put 2500 or more ports of 10 GbE (or similar capacity ports) in the space of a single 19" wide relay rack using available technology at the time of this claim. Further, this switch can be expanded into a closely coupled switch (that is, there is significant bandwidth between all the components of the switch) in a multiplicity of such relay racks, to provide more than 30,000 or more ports of 10 GbE. Further, this architecture has the ability to expand to configurations that can hold a near indefinite number of such ports, including concepts that can hold over 210,000 such data ports, and concepts that can hold over 1.9 million such data ports.

In at least one embodiment, switching is accomplished in a novel and unique fashion by providing for multiple parallel paths using a distributed switching architecture. Through the use of a distributed switching architecture, incoming data packets do not need to all pass through the same switching engine such as the shared bus architecture requires. Incremental switching decisions are performed at multiple points in the switch as the data traffic travels from point to point. Multiple parallel paths are provided to increase the bandwidth from data ingress to data egress through the switch. Optionally, it is possible to design some paths to be more resource efficient going in opposite directions from each other. To make maximum utilization of the non-symmetrical capacities of each path will require the use of an intelligent Switch Management Processor (SMP).

In at least one embodiment, the aggregate switching capacity of the switch is a significant percentage of the sum of the switching capacity of each point located along the multiple paths of the switch.

In at least one embodiment, a switching architecture for a packet data switch includes a multiplicity of interconnecting switching nodes. The interconnecting switching nodes, when connected to each other in an interconnecting matrix, provide a multiplicity of data paths between each incoming data or telecom port (herein referred to as a 'port') and every outgoing port of the data switch. The interconnecting switching nodes can achieve high capacity data switching by providing a partial switching solution at each node, and by distributing the received data to different switching nodes, sharing the switching load.

In at least one embodiment, a switching protocol for interconnecting switching nodes allows data packets to be selectively passed from any incoming port on an interconnecting switch node to any interconnecting switching node connected to it. In at least one example, the switching protocol has mechanisms in it to provide for the duplicating of the contents of the data packet and pass them to multiple interconnecting switching nodes or outgoing ports. The switching protocol may have mechanisms in it to provide for a means of a SMP to discover, or learn, the organization and interconnectivity of the interconnecting switching nodes without any foreknowledge of the switching architecture. The SMP can reside outside of the switch while having access to the internal switching architecture of the switch. A version of the SMP called the Chassis Management Processor (CMP) may plug directly into the backplane and directly access the internal data paths to manage all the cards in one chassis. When the chassis is the only chassis of a switch, then the CMP is also the SMP. When there are multiple chassis in a switch, an external SMP is used to control the CMPs and through the CMPs gain indirect access to the data paths inside each chassis. In the accompanying example of an implementation of this switch, the SMP will interface to the CMPs using ethernet, although any acceptable protocol may be used. Ethernet is used in the example due to fact that the relatively long range of many ethernet carrying technologies allows the SMP to be located where convenient for the switch location, which doesn't have to be immediately adjacent to the chassis or the switch.

According to at least one embodiment a packet-data switching system includes multiple interconnecting switching nodes, each switching node configured for partial switching to route data packets to other nodes, to ports on the switching node, to one or more management processors, or to an embedded Central Processor Unit (CPU) of the switching node. The interconnecting switching nodes are configured to host incoming ports and outgoing ports for the packet-data switching system. A port card carries one or more of the interconnecting switching nodes. The port card carries either a single port or a multiplicity of ports. Each single port or multiplicity of ports is capable of high capacity speeds of up to about 10 Giga bits per second (Gbps), which is 10,000 Million Bits Per Second, for example, 10 Giga Bit Ethernet (10 GbE) or Optical Carrier 192 (OC-192), or alternately 40 Gbps, for example 40 GbE or OC-768, or alternately 100 Gbps, for example 100 GbE. As new technologies and new standards emerge, higher port speeds can be supported by this switching architecture, which is not limited by any node count, port count, port protocol, or port speeds per port card. The packet-data switching system is configured with a switching matrix function that interconnects different port cards together with significant bandwidth into and out of each port card.

In at least one example, a switching matrix function optionally provides a device or access to a management processor to interface to the embedded CPU on each node through the use of in-band traffic, that is, utilizes the same paths that traffic traveling from the receiving side of a port to the transmitting side of a port utilizes.

In at least one example, the packet-data switching system includes a multiplicity of nodes, and a multiplicity of paths to connect between each port and each node, between two ports, or between two nodes. The multiplicity of nodes and paths further includes: a multiplicity of interconnected paths between a receive side of each port and a transmit side of every port, enabling data packets received on any port to travel different routes through the packet-data switching system and be passed through different switching engines to distribute the switching load; a multiplicity of nodes (a node is where three or more paths or ports meet and consists of one or more switching engines), wherein each switching engine can switch a data packet from any incoming portion of any path, the output of an embedded CPU in the node, the output of a management processor, or the receive side of any port connected to it (herein referred to as data sources); a multiplicity of holding or queuing buffers whose input is a data source or the output of a switching engine, and whose output goes to the input of a switching engine (herein referred to as an 'ingress point' of the switching engine); outputs of the switching engine (herein referred to as an 'egress point' of the switching engine) each of which goes into the input of a holding or queuing buffer, there being a multiplicity of such buffers, one for each egress point; an output of a holding or queuing buffer whose input is an egress point, which will go to an ingress point, the input of a path, the input of an embedded CPU or management processor, or the transmit side of a port (herein referred to as a data destination); and a holding buffer which has no priority of services and is strictly a first in first out buffer, and a queuing buffer being a multiplicity of holding buffers with a common input and common output, configured to hold different priorities of traffic, such that when the queuing buffer is delivering data at its output the highest priority portion with data in it will deliver its data, the queuing buffer being either a multiplicity of independent buffers or a single buffer logically broken up into a multiplicity of compartments, one for each level of priority said queuing buffer is configured to handle.

In at least one example, the packet-data switching system further includes one or more physical links between a data source and a data destination, the aggregate capacity of which being less than, equal to, or exceeding the capacity of any port of the switching architecture. Further the path in one direction may have a different capacity than the path in the other direction. Further, the path in one direction may go to a data destination which is not the data source for the return path. Further, when they exist the non-symmetrical nature of paths within the switching architecture enables network engineers who must determine how to best interface a switch built upon this switching architecture to the telecom or data network to utilize the switch such that network connections which will carry a significant amount of traffic between them will be connected to ports with more bandwidth between them than with ports that have less bandwidth between them.

In at least one example, the packet-data switching system further includes two identical hardware elements between a port and a node or between two nodes, such that if one of the hardware elements fails, the remaining hardware element is capable of performing an intended job, such that the packet-data switching system continues to function while the failed hardware is removed and replaced. These hardware elements may be switching nodes with or without ports on them, or they may be any custom function desired by the user of the switch. Paths between the node and the identical hardware element include a separate but equal path from a node or port to each identical hardware element, each path carrying identical traffic and a separate but equal path from each identical hardware element to the node or port, which shall carry the same traffic back to the node, in or out of synchronization with each other. The receiving portion of the node or port that is receiving traffic from the two identical hardware elements accepting traffic from only one of them, remaining synchronized to both hardware elements such that if the hardware element whose traffic it is accepting fails, it can swiftly switch over to the other hardware elements to minimize the loss of traffic that occurs during such a fault. Internal management traffic used to control the two identical hardware elements shall be accepted by the node or port from both identical hardware elements regardless of which hardware function it accepts network traffic from, so that management processors are capable of communicating with embedded CPUs inside the hardware elements.

In at least one example, the packet-data switching system further includes a mechanism for selectively passing data packets from any data source to any data destination. The mechanism includes a Physical Address Routing Only (PAR-Only) routing mechanism in the packet-data switching system that does not rely upon any lookup tables in the nodes to route traffic. As such, the switch does not need to be initialized before management traffic can pass through it to enable the management processors to discover, test, and initialize all ports and nodes. PAR-Only routing is accomplished by having a list of physical addresses of the egress points of each switching engine placed in an address list in the header of the internal data packet, with the address at the beginning of the list pointing to the egress point of the switching engine the packet is entering on an ingress point. As the packet passes through the switching engine, all the values in the address list are moved forward by one position so that when the packet reaches the next switching engine the address of its egress point will be at the beginning of the list. Further, there is a mechanism where the address in the address list is sufficiently robust that it has the capacity to identify the egress point in two or more consecutive switching engines, wherein only the last switching engine whose egress point is addressed by the front address in the address list will advance the addresses in the address list; and a mechanism to prevent endless circulation of a packet data in the packet-data switching system by, while advancing addresses of the egress point of the switching engine in the address list in the packet header, the switching engine backfills the last address with a special address that will cause the packet to be deleted if it reaches the front of the address list. The packet-data switching system has a mechanism to duplicate the packet and send it to more than one egress point concurrently. The packet-data switching system has a mechanism to uniquely identify the packet when it is being duplicated and to alter the identification information of the packet at the egress point when needed, so that each local copy of the duplicated packet has a different identification information in it. The packet-data switching system is configured to prioritize packets so higher priority packets will pass through the switching architecture more quickly, and when congestion occurs, lower priority packets are discarded while retaining higher priority packets.

In at least one example, the packet-data switching system keeps all data packets of a received datagram such as an IP jumbo frame together as it travels through the packet-data switching system. In such an example the packet-data switching system further includes: a mechanism to identify the leading packet, continuation packets, and final packet of a multi-packet datagram, and to be able to differentiate them from an 'only' packet that does not require continuation or final packets to contain an entire IP frame or other external packet; and a mechanism that requires a switching engine to switch all packets of a multi-packet datagram consecutively. If a multi-packet datagram has to be discarded it is all kept together such that no mechanism is needed to remember which bits and pieces have been discarded and which have not. Since the continuation and final packet immediately and always follow the first packet, they use the routing information in the header of the first packet and thus reserve the space normally set aside in the packet header for routing and identification information to carry more user traffic, making more efficient use of internal bandwidth. At the transmitting port, the port does not need to keep track of collecting bits and pieces of multiple large frames concurrently, as each multi-packet frame will be received in its entirety without interruption.

In at least one example, the packet-data switching system further includes mechanisms to provide for the duplicating of external traffic to support multicasting/broadcasting, port mirroring, or to meet government regulations for wire tapping. The mechanisms include: a mechanism in which, as each packet passes through a switching engine, a multiplicity of egress points concurrently receive the packet, creating their own localized copy and thus providing the duplicating capability; and a mechanism in which, as a packet is duplicated, each duplicated packet has different identifying information attached to it that enable it to be uniquely routed to its destination. A packet may utilize PAR-Only routing partially through the switch, and somewhere inside the switch the duplication process occurs, after which the unique identification information attached to the packet is used to independently route each copy the rest of the way through the switching system.

In at least one example, a symmetric design is implemented such that a minimal number of Printed Circuit card Assemblies (PCA) designs and node designs are needed to fully implement said packet-data switching system. The symmetric design includes: a backplane design interconnecting in a chassis all port cards, management processor interface cards, management processors, disk drives for the management processors, and power supplies for the other cards installed in the backplane; a port card configured to accommodate any port interface up to 40 Gbps; a port card configured to accommodate port interfaces of 100 GbE, having the same interface to the backplane as the port card that can host port interfaces of up to 40 Gbps, the switching system configured to function with and without this port card; at least one additional port card configured to accommodate other or as of yet undefined interfaces according to additional industry standards, the switching system configured to function with and without this additional port card; a management processor interface card, which provides switching matrix functions to connect port cards installed in the backplane together and provides an interface between the port cards and the management processor; a management processor interface that enables a Commercial Off The Shelf (COTS) processor to be plugged directly into the backplane; a hard disk drive interface with a power supply to convert the power available on the backplane to levels acceptable to a hard disk drive based on commercially acceptable interfaces, such as SATA, and said hard disk drive interface can have a hard disk drive (either a rotating disk drive or solid state disk drive) to plug directly into it; and power supplies to convert power from a power source into acceptable voltages on the backplane.

In at least one example, the management processor is separated such that it is not integral to any board design of the switch, enabling customers to select their own management processor and operating system to provide higher network security. As such, the packet-data switching system further includes mechanisms for providing an SMP to reside outside of the switching system while having direct access or indirect access to internal switching architecture and data paths of the switch system. The mechanisms include: a mechanism by which said MP is not architecturally built into any printed circuit card of the switch, but instead a connector based on COTS technology and standards is installed for the SMP to be hosted on any compatible processor card to manage the switch, which provides enhanced security for an owner of the switch such that a) the switch owner is allowed to discretely select their choice of SMP, being kept undisclosed to the outside world, makes attempts by malevolent parties to take control of the switch significantly more difficult since they won't know which processor they are dealing with, and b) a user has their own proprietary processor and operating system, which gives the user the ability to avoid, by use of undisclosed architecture and software, having an MP whose design is known to others thereby providing even greater difficulty against malevolent parties from knowing how to exploit any potential weakness in their switch's MP security features; a mechanism by which a switch has multiple SMPs to share the load of managing a large switch; and a mechanism by which a switch has multiple SMPs of different designs such that if a flaw in the operating software or hardware design of one SMP causes it to behave erratically a different SMP can detect such behavior, preventing the flawed SMP from having further impact with the switch, and assume full responsibility for managing the switch until such time the flaw has been removed from the failed SMP.

In at least one example, an ability of the management processor is to initialize the switch utilizing in-band connections when there are no routing tables set up. As such, the PAR-Only routing allows the CMP to route data packets to every node's embedded CPU and port's embedded CPU before the nodes or ports have any routing tables loaded into it, and the PAR-Only routing mechanism in the packet-data switching system includes: switching engines whose egress points are directly addressable by an address field in the internal data packet; and a localized embedded CPU at each node or port that is responsible for taking commands from the CMP and executing them. The localized embedded CPU has the ability to initialize all routing tables of all switching engines in its node or appropriate tables in it port or ports, report the contents of said tables to the CMP, gather traffic statistics and send them to the CMP, identify where the node or port is installed in the switch and report the location and the node type or port type to the CMP. The localized embedded CPU is configured to extract the origin identification field of any data packet that is deleted by a switching engine and transmit said field back to the CMP, along with an indication of the reason why the switching engine deleted it.

In at least one example, the receive side of a port can examine the destination address or unique identification field of the incoming packet at the port and compare it to a list of acceptable values that are preloaded into it via commands from the CMP. The packet-data switching system includes: a mechanism to search for and declare a match or mismatch of the incoming data packet's destination address or unique identification number; a mechanism to store a predetermined path through the switch to route an unrecognized external packet to the CMP so it can decide what to do with the packet when there is no match; a device storing a lookup table to load the header of the first or only internal packet that the external packet is placed into with values predetermined by the CMP so that it may be routed through the switch; and a mechanism to prevent received packets from being routed into the localized embedded CPU of the node or port to prevent an external user from being able to take control of the node or port.

Regarding the types of data traffic that can connect to the switch and how the switch processes the traffic, in at least one example, the ports support multiple forms of high speed data protocols. The packet-data switching system includes: a mechanism where Field Programmable Gate Arrays (FPGA) or Application Specific Integrated Circuits (ASIC) are developed that handles any protocol, and can be reprogrammed or replaced with another ASIC that handles different protocols; an external interface that allows the ASIC or FPGA to connect to a multiplicity of different telecom or data physical interfaces, such as the Quad Small Form-factor Pluggable (QSFP) standards to handle either a single 40 Gbps interface utilizing four interfaces working in concert with each other or up to four independent interfaces at speeds limited only by the interface speeds; on a different port card design, an external interface that allows the ASIC or FPGA to connect to a multiplicity of telecom or data physical interfaces for faster port speeds as industry standards are developed; a mechanism to support a multiplicity of priority data traffic, said mechanism enabling high priority traffic to pass through switching engines sooner than low priority traffic, and said mechanism enabling the acceptance of high priority traffic to continue to pass through the switching engines while discarding lower priority traffic during periods of heavy traffic; and a mechanism wherein said switching protocol's data priority scheme is configured to allocate a guaranteed amount of bandwidth to higher priority traffic, or to allow higher priority traffic all the bandwidth needed, routing lower priority traffic only when there is available bandwidth.

Regarding how data packets are switched inside each partial switching function, how the partial switching function selects which packet to switch, and what happens to the packet after it has passed through the partial switching function, according to at least one embodiment, a packet-data switching system for switching a packet from any number of ingress points to any number of egress points, the switching system comprising a mechanism to detect a packet in each queuing buffer or holding buffer of each ingress point, wherein: said mechanism is capable of differentiating between queuing buffers of different priorities; said mechanism has a round-robin scheme that goes from ingress point to ingress point, selecting an available packet in the highest priority queuing buffer, and if no such packets are available, going to the next highest priority buffer and selecting a packet, progressing down until the lowest priority buffers of each ingress point; said mechanism has a scheme of preventing egress points from accepting packets when there are no packets available to be passed through the switching engine; said mechanism has a scheme of discarding a packet if it detects an invalid or unassigned physical address in the front of the address field, which shall include the address value set aside for dropping packets, when the address flows from the backfilled addresses in the address list to the front address; said mechanism has a scheme of continuing to select packets from the same queuing buffer or holding buffer when a multi-packet IP Jumbo frame or other large data packet is passing through the switching engine to keep said packets together; said mechanism has a scheme of discontinuing selecting packets from the same queuing buffer or holding buffer when the number of consecutive packets passed from it exceeds a threshold for the number of packets needed to carry the largest external packet the switch is designed to receive; said mechanism presents all packets selected to be switched to a common point that all egress points may access; said mechanism allows each egress point selected to receive the packet to do so, and to retain knowledge of which egress point is to receive the packets when a multi-packet IP Jumbo frame or other large data packet is passing through the switching engine for the continuation and ending packets of the multi-packet frame; said mechanism, at each egress point, contains a lookup table that may replace the unique identification value of the packet with a new value; said mechanism, at each egress point, contains a holding buffer or queuing buffer large enough to hold at least two multi-packet IP Jumbo frames or other of the largest data packets the switch is designed to receive; and said mechanism, at each egress point, can delete a multi-packet group from each egress buffer if an error is detected in the multi-packet group, errors including continuation or final packets of a multi-packet frame that are out of sequence, continuation or final packets without a preceding continuation or starting packet, or starting or only packet following a starting packet or continuation packet, as well as buffer overflows.

In at least one example, the switching system is configured for high throughput by utilizing: a large width in the common point of the switching engine such that an entire data packet can pass through the switching engine in a minimum number of internal clock periods of the interconnecting switching node, including just one clock period; a search engine that examines all holding buffers and queuing buffers on each ingress point of the switching engine concurrently to find a packet waiting to be switched, and selects the next available packet based on the round-robin scheme and upon the priority buffer it is in when the ingress point is fed by the output of a queuing buffer; and a mechanism that allows the switching engine to switch from ingress point to ingress point on a clock-by-clock basis so that no unused clock periods are needed to change ingress points selected for the data packet source for the switching engine.

According to at least one embodiment, an internal switching protocol-configured system that provides for a means of passing packets between switching engines, paths, embedded CPUs, management processors, and ports. The system includes: a mechanism to handle messages, including externally received packets, that are small enough to be carried in a single internal packet; a mechanism to handle externally received packets that are too large to fit into a single internal packet, comprising of a starting packet and an ending packet, and as many continuation packets as needed to carry the balance of the externally received packet; a mechanism to implement a sequencing scheme for the continuation and final packets of a multi-packet group to detect lost, duplicated, or otherwise mis-sequenced packets, and while in the first packet or only packet types of packets, a mechanism exists to identify the packet's priority; a mechanism to count the number of continuation packets in a multi-packet group and determine that it is too large for the switch to carry; a mechanism to implement a PAR-Only routing scheme consisting of a multiplicity of address fields that are advanced to the front, or beginning address field, used to route the packet through the switch without having to use routing tables in the switch to route the packet; a mechanism to set aside a few address values in the address field to specify a packet that is to be dropped; to specify that the packet is to be routed using a unique ID of the packet, and a mechanism to specify that the unique ID of the packet is to be replaced at the egress point; a mechanism to record the unique location of the packet's point of origin, so that if an error is encountered, when the error is made known to the MP it will know where the packet came from; a mechanism to utilize the Virtual Path field of the ATM cell as the unique ID field of the packet, when the packet carries an ATM cell; and a mechanism to identify how much of the payload capacity of the only packet or the final packet of a multi-packet group actually carries valid data (in a multi-packet group, first packets and continuation packets have 100% of their payload being used, therefore, such a mechanism is not needed for those types of packets).

A switching architecture for a packet data switch includes a multiplicity of interconnecting switching nodes, which, when connected to each other in an interconnecting matrix, provide a multiplicity of data paths between an incoming port and an outgoing port. The switching nodes achieve high capacity data switching by providing a partial switching solution at each node, distributing the switching load. A switching protocol selectively passes packets from any packet source into to any packet destination inside each node. A mechanism to duplicate the contents of a data packet and pass the contents to multiple nodes or outgoing ports. A switching architecture that avoids requiring an outgoing port to assemble more than one outgoing message at a time. A switching architecture that allows any number of different SMPs to be used, including proprietary types making hacker exploitation difficult.

A data switch for a packet data switch includes switching nodes connected to each other in an interconnecting matrix, providing a multiplicity of data paths between an incoming port and an outgoing port of the data switch. The interconnecting switching nodes can achieve high capacity data switching by providing a partial switching solution at each node, distributing the switching load. A switching protocol for interconnecting switching nodes allows data packets to be selectively passed from any incoming port on an interconnecting switch node to any interconnecting switching node or outgoing port connected to it. In at least one example, the switching protocol has mechanisms in it to provide for the duplicating of the contents of the data packet and pass them to multiple interconnecting switching nodes or outgoing ports.

A switching architecture that avoids the design difficulties of requiring an outgoing port to assemble more than one outgoing message at a time. A switching architecture allows any number of different designs of SMPs to be used. In at least one example, by using an undisclosed management processor design, the architecture makes it significantly more difficult for a hacker to exploit any potential weakness in the SMP design or operating system. A switching architecture that can concurrently carry different line protocols such as Internet Protocol, ATM, Frame Relay, or other protocols through it. A switching architecture can grow in size as technological improvements in the development of integrated circuits in switching nodes enables more backplanes to be closely coupled to each other, allowing for indefinite growth.

In at least one embodiment, an absolute address is used when a packet advances.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

Figure 1:
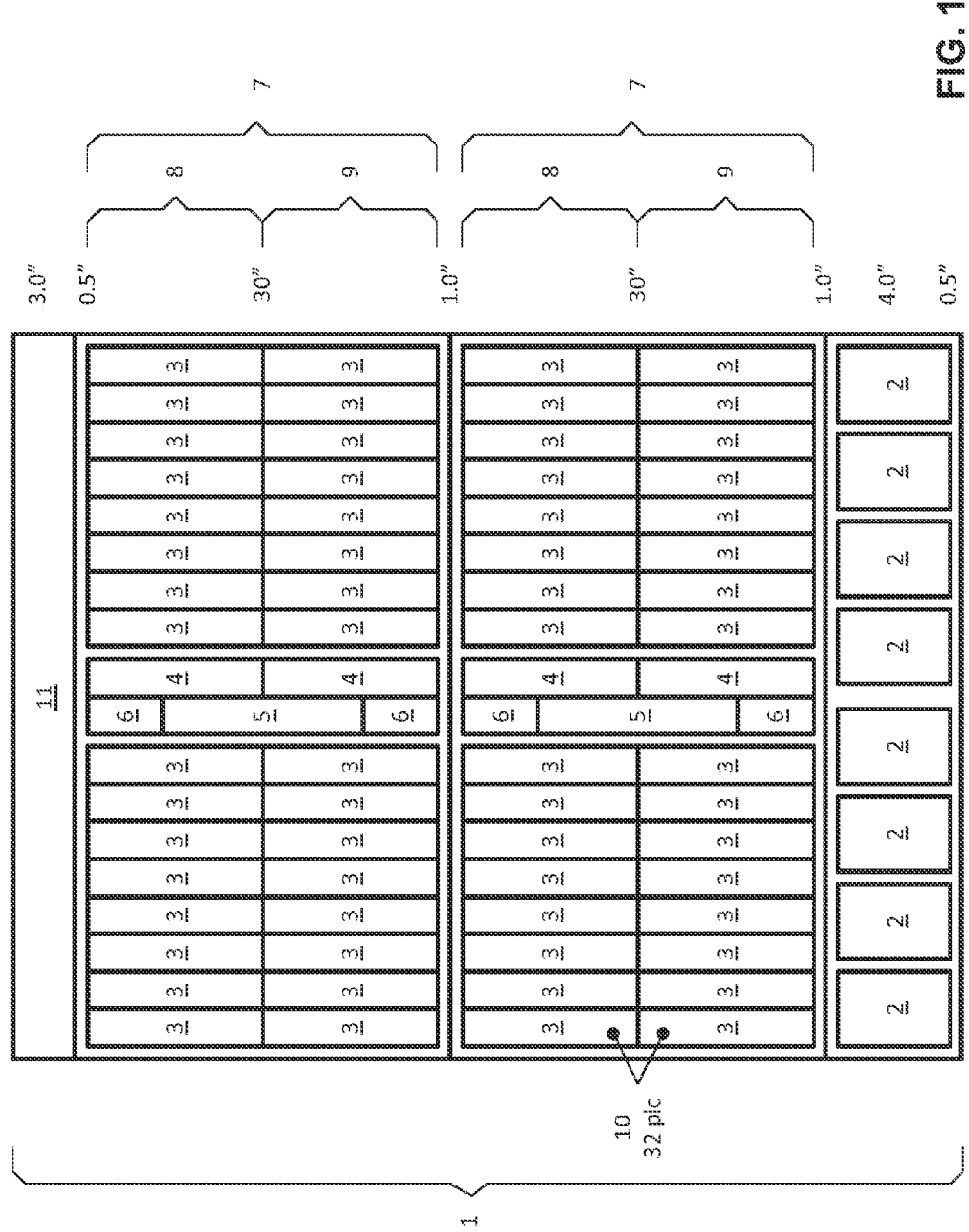
FIG. 1 depicts an embodiment of a Midplane Chassis Physical Arrangement.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Functional implementations according to one or more embodiments are illustrated in the drawings. The following definitions may be used in the drawings and in these descriptions:

ATM Cells Asynchronous Transfer Mode (ATM) is an early form of the internet backbone protocol, and are carried in fixed sized packets known as ATM cells.

Datagram A fixed size collection of data that internally passes through the switch from any data source to any data destination. Data sources can include the incoming ports, the CMP for the chassis, or the embedded CPU inside each Field Programmable Gate Array (FPGA). Data destinations can include the outgoing ports, the CMP of the equipment or the embedded CPU of each FPGA.

Packet A fixed or variable sized collection of data carried over commonly accepted protocols between different telecom or data devices. Packets discussed in this implementation of the invention are either associated with Internet Protocol (IP) or ATM cells, but are not limited to these two types.

The following acronyms may be used in drawings and in these descriptions:
AF Address Field
ATM Asynchronous Transfer Mode
BCI Boot Code Interface
BIT Built In Test
CIF CMP Interface FPGA
CMP Chassis Management Processor
CMPI Chassis Management Processor Interface card
CPSF Card Position Source Field
CPU Central Processor Unit
CSF Chassis Source Field
DC Direct Current
DDgR Double Datagram Receiver
DDgT Double Datagram Transmitter
DgR Datagram Receiver
DgT Datagram Transmitter
DRAM Dynamic Random Access Memory
ECC Error Code Correction
FIFO First In First Out
FPGA Field Programmable Gate Array
GbE Gigabit Ethernet
Gbps Gigabit per second
HDD Hard Disk Drive
I2C Inter-Integrated Circuit
ICF Inter-Connecting FPGA
IP Internet Protocol
IPMI Inter-Processor Management Interface
IPv4 Internet Protocol Version 4
IPv6 Internet Protocol Version 6
LVDS Low Voltage Differential Swing
MLAB Memory Logic Array Block
NAF Next Address Field
NVM Non-Volatile Memory
OS Operating System
PAR Physical Address Routing
PCA Printed Circuit card Assembly
PCI Peripheral Component Interchange
PCIe PCI express
PCIeI PCIe Interface
PF Priority Field
PLE Packet Lookup Engine
PLF Pay Load Field PRE Packet Reassembly Engine
PS Power Supply
PSF Port Source Field
QSFP Quad Serial Fiber Port
RAID Redundant Array of Independent Drives
RF Routing Field
RFD Receiver Framer Deserializer
RFU Reserved for Future Use
SATA Serial Advanced Transport Architecture
SSD Solid State Disk
SMP Switch Management Processor
SONET Synchronous Optical NETwork
SPI Serial Peripheral Interface
SSF Switch Source Field
SWE SWitching Engine
TF Type Field
TPF Telecom Port FPGA
TPT Telecom Port Transmitter
VC Virtual Channel
VP Virtual Path
VP Virtual Path A novel architecture for a data switch is disclosed that provides extraordinarily large switching capacities. In at least one example, the proposed switch has a total port capacity of over 300,000 billion bits per second, or 30,000 10 GbE ports, spread across twelve co-located chassis. This would make it more than ten times larger versus existing switches. Multiple copies of these switches may also be co-located and connected together to provide larger capacities such as 210,000 ports of 10 GbE, for example, although the bandwidth between the different switches will not be as large as the bandwidth between the ports inside each individual switch.

Its primary missions are to provide layer 2 switching capability to large data centers, and layer 2 or broadband cross-connect capabilities to Tier 1 Internet Service Providers. The switch may also be used to connect large computing nodes together to help connect together the next generation of ultra-large computing engines. Under these circumstances the FPGAs used to provide the port interfaces to the switch can be programmed to provide PCIe ports or rather than telecom or data ports.

The switch achieves this enormous size by using multiple routes (literally tens of thousands of combinations are available in the example that accompanies the patent application) from the receive side of any port to the transmit side of any port. In the example, there are around 45 paths that leave each receive port and 45 paths that enter into each transmit port. Each of these paths can carry anywhere from 10 Gbps to 14 Gbps, depending on how far away the co-located chassis are from each other. Each path goes to a different intermediate switching node. Each intermediate switching node contains around 55 paths into and out of them. In some instances there are multiple occurrences of these intermediate switching nodes between a received port and the transmit port the packet goes to.

At each intermediate switching node, as well as at groups of receive ports and groups of transmit ports, are multiple switching engines each capable of switching over 250 billion bits per second. There are over five thousand of the switching engines strategically placed throughout the switch in the example provided. A packet can be routed over any path, through a switching engine to another path, through another switching engine to any other path one or more times, and to the final transmit port.

As technology improves, the switching capacity of the switching engines, the number of paths available to each port, and the speed of the paths, will all increase. All of these increases will allow the switch to handle more traffic and larger numbers of ports.

The uniqueness of this switch design allows the SMP to select a route from among the thousands available and utilize it for a new route. Once done, the receive port will place the data packet inside an internal encapsulation layer that contains the selected routing information, and sent it through the switch. As the encapsulation layer can contain all the routing information the packet needs, there is very little additional setup effort needed by the SMP to prepare the rest of the switch. Occasionally, packet duplication is needed for port mirroring, broadcast services, or to fulfill government regulations for court-ordered wire tapping. These will take more effort on the part of the SMP to set the path up as the intermediate and destination nodes have to be prepped to handle the duplication effort.

The SMP keeps track of all the paths set up through switch and the anticipated bandwidth consumed on each path (it receives frequent, periodic updates from the ports as to how much traffic each packet address consumes). Requests for new service will be routed over paths with lower bandwidth usage, and dormant routes will be deleted. As the sum total capacity of the internal paths from the receive ports to the transmit ports have about two to three times the total bandwidth of the ports, they won't be overloaded as long as the SMP does an efficient job managing them.

Although traffic can take longer to go from an input port on it to an output port than smaller switches, this switch will replace multiple smaller switches that are interconnected to provide the bandwidth needed through a large switching center. The sum of the delays through the multiple switches will be similar or more than the total delay through this one large switch.

In at least one implementation embodiment, a data switch consists of at least one chassis. A single chassis is shown in FIG. 1. In the chassis 1 shown in FIG. 1, the implementation consists of a multiplicity of power supplies 2, two shelves 7, a multiplicity of port cards 3, two redundant pairs of Chassis Management Processor Interface (CMPI) cards 4, a redundant pair of Chassis Management Processors (CMPs) 5, and two disk drive positions equipped with Hard Disk Drives (HDDs) 6 organized in a Redundant Array of Independent Drives (RAIDs) type 1 for each CMP. Included in the space for the HDD 6 is the power supply for each. Note that the HDD 6 can be a rotating disk drive or a Solid State Disk (SSD) drive. Note that the gaps between the port cards 3 and the CMP 5 or the CMPI 4 are for logical separation only and do not have to physically exist.

Arrangement of Craftsperson Replaceable Assemblies— Arrangement and architecture of the power supplies 2, and the organization of the HDDs 6 and their arrangement are shown in the example so that a practical implementation of the invention is realized. Each chassis 1 consists of two shelves 7. Each shelf 7 contains a redundant pair of CMPIs 4, a CMP 5, two HDDs 6 for the CMP 5, and up to 32 port cards 3. Each shelf 7 consists of a top row 8 and a bottom row 9. The port card 3 in the top row 8 of each shelf 7 is interconnected to the port card 3 immediately below in the bottom row 9 in a tightly coupled arrangement that allows the upper and lower port cards 3 to be treated as a single entity called a port card slot 10. There are up to 16 port card slots 10 per shelf 7, and 32 per chassis 1. Each port card slot 10 is connected to both redundant sets of CMPIs 4, as will be detailed later.

The CMPIs 4 in each shelf 7 are redundant, for example copies of each other. There are two sets of redundant CMPIs 4 in the chassis 1. Each set may carry half of the switching load between different port card slots 10 of the chassis 1. If one CMPI 4 fails in either set the other one is capable of carrying that set's portion of the switching load.

The CMPs 5, one in each shelf 7, are redundant, for example copies of each other. If one CMP 5 fails the other is capable managing the entire chassis 1. When a CMP 5 is replaced, it will communicate with the CMP 5 that was managing the chassis 1 and update all the files on its HDD 6 autonomously.

The HDDs 6, which can be for example rotating disk drives or solid state drives, are connected to the CMP 5 in the same shelf 7. Connected in a RAID 1 arrangement, this configuration has two mirrored drives, each with a complete set of all files. If either HDD 6 fails the other one is capable of fulfilling the entire disk drive requirements of the CMP 5 in its shelf 7. The HDDs 6 of each CMP 5 are not shared with the other CMP 5 in case a CMP 5, upon failure, corrupts the files or operating system on its HDD 6.

Port Card Redundancy—Port card 3 redundancy is done at the system installation level. There are two ways of doing port card redundancy. One uses a hardware redundancy mechanism, the other disables the hardware mechanism and uses system installation software. When redundancy is done by hardware, each port card 3 in a port card slot 10 is the redundant mate of each other. During a 1:1 redundant arrangement the traffic is shared between the two port cards. When one port card fails all the traffic going over the failed card is rerouted to the other port card. This form of redundancy is not as efficient at utilizing port capacity as the software redundancy. When redundancy is done via software, it is done in an N+M (N plus M) arrangement between two switches 80 (FIG. 6) capable of supporting such an option. In this case, there are N+M links between the two switches. N links are the minimum needed to carry the peak sustained traffic (peak sustained traffic is the average peak traffic after it has been smoothed out using buffers to absorb the spikes in traffic, sending out the excess traffic during those periods of time where spikes are not occurring). The traffic to be carried by N links is spread out over all N+M links. If a link goes down, the traffic it was carrying is quickly spread out over the remaining links.

Up to M links may fail and the switch will still carry peak sustained traffic. While the odds of more than 1 port on a port card 3 in any N+M arrangement failing at the same time are extremely remote, a backhoe fade (where the fiber lines between two switches are cut due to construction, accidents, or acts of sabotage) can shut down multiple links between two switches 80. System network implementers should design connections between two switches 80 such that no more than M links are in any one cable or set of adjacent cables. When implementing any form of an N+M redundancy, only one port per port card 3 shall be used in each N+M collection of ports.

Power Supplies—Power Supply 2 organization is exemplified to provide a practical means of implementing the invention. In this implementation, it is recommended that power supplies 2 have a fan at the back end of each power supply 2 that pulls cooling air through the power supply 2 to cool it off. Said fan, by being placed in the back of the power supply 2, will be muffled by the power supply 2 to minimize the noise it introduces in the switching center it is installed in. A removable filter on the front of the power supply 2 will collect most dust that would otherwise enter the power supply 2 and hence the rest of the chassis 1. The filter can be removed, washed and re-inserted or replaced without removing the power supply 2 or turning it off. The duration of time that the filter would be removed is so small that the amount of dust that gets inside would be negligible.

The power supplies are arranged into two separate power buses, with each bus having N+1 supplies on it. That is, each bus needs N number of power supplies 2 to power the chassis 1, with an additional power supply 2 as a redundant backup so that if any power supply 2 failed the others could supply the entire power needs of the chassis 1. Two separate buses are supplied. If a power converter on any card fails, the alternate converter on that card (port card 3, CMPI 4, or CMP 5 if it is so equipped) can continue to power its load until a craftsperson can replace it during a maintenance window. Maintenance windows are typically that period of time when traffic through the chassis 1 is at its lowest.

Each load may have two sets of converters, one powered by one power bus and the other powered by the other power bus, except for the HDD 6 and CMP 5. Each HDD 6 assigned to a CMP 5 may be powered by a separate bus.

Flow of Cooling Air—How the chassis 1 is described to provides a practical means of implementing the invention. Cooling air exiting the rear of the power supply 2 does not leave the chassis, but instead enters a baffle in the frame of the chassis 1 between the power supplies 2 and the lower row 9 of the lower shelf 7. From this baffle, air flows up in between each of the port cards 3, the CMPI 4, the CMP 5 and HDD 6, cooling them off. The cooling air then moves between the lower row 9 and upper row 8 of its shelf 7, and then from the lower shelf 7 to the upper shelf 7. It then exits the chassis 1 through a vented hood 11 that causes the air to exit to the rear of the chassis 1. This minimizes the chances that heated air enters another piece of equipment above the chassis if it is front vented.

In a chassis 1 where not every card slot is occupied, empty slots have a cover to provide a near-air tight cavity that keeps cooling air flowing up through the chassis 1 rather than out the front of it. The cover shall also provide an EMI barrier to help keep emissions out of the chassis 1 down. Between each power supply 2 and the lower baffle of the chassis 1 are a series of gravity or spring fed doors that open when cooling air from the fan in the power supply 2 is flowing. When there is no air flowing, the doors close, minimizing air blown into the baffle by the other power supplies 2 from exiting through the empty power supply 2 slot.

The power supplies 2 have thermal sensors in them that alarm when internal temperatures exceed a warning point, and shut down the power supply when the temperature exceeds a critical failure point. The fan inside each power supply 2 should also have a spin detection sensor that alarms when the fan speed stays below a certain minimum speed. There may be a time delay between the detection of below speed operation and alarm to give the fan enough time to get above alarm point during power up.

Port Card—The port card 3 contains the port interfaces and most of the switching matrix for the chassis 1 and the multi-chassis switch 80. Each port card 3 has the architecture shown FIG. 2.

Figure 2:
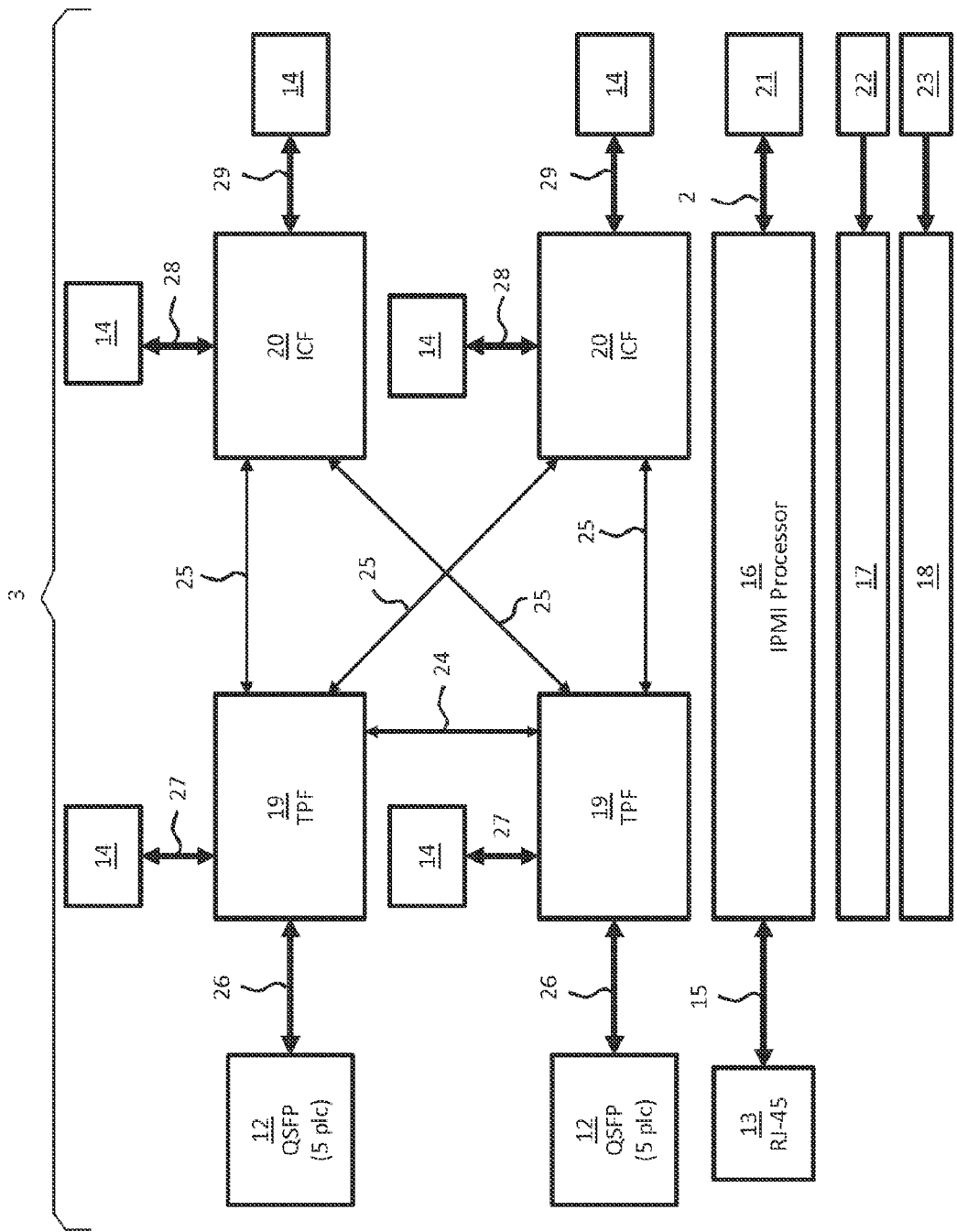
FIG. 2 depicts an embodiment of a port card architecture that is a daughtercard to the Midplane Chassis Physical Arrangement.

FIG. 2—Port Card 3 Architecture—This particular architecture is designed around the Altera Corporation Stratix 5 series FPGA, such as the 5SGXB6 or similar. This FPGA type has 66 high speed serial links 26, 27, 28, 29 and numerous other lower speed Low Voltage Differential Swing (LVDS) links 24, 25 on each FPGA. In the port card 3 are two different implementations of FPGAs, the Telecom Port FPGA (TPF) 19 and the Inter-Connecting FPGA (ICF) 20.

The LVDS links 24, 25 are used for on-card connections as there are insufficient high speed links 26, 27, 28, 29 available on the FPGAs 19, 20 when all off-card connections to other port cards 3 are made. Future enhancements in FPGA designs may mitigate the need for the use of LVDS links 24, 25 on-card as they may contain more high speed serial links.

Telecom Port FPGA Use On The Port Card—The TPF 19 uses twenty of its high speed links for telecom or data ports 26, and can support either 20 interfaces of 10 Gbps (OC-192 or 10 GbE), or 5 interfaces of 40 Gbps (OC-768 or 40 GbE), or two interfaces of 100 GbE (100 Gigabit ethernet). For cards that support 10 Gbps and 40 Gbps links, four high speed serial links assigned as ports go to each of five different Quad Serial Fiber Ports (QSFP) connectors 12. QSFP is an industry standard connector with a cavity that can have either four 10 Gbps ports or one 40 Gbps port inserted into it. The TPF 19 will have to be pre-configured for one port type or the other for each QSFP connector 12, which are located on the front faceplate of the port card 3. The QSFP 12 can support any combination of ports, although typically they will all be the same type. The interfaces over the ports are either ATM over Synchronous Optical NETwork (SONET), IP Packet over SONET, or IP Packet over Ethernet. Other standards and speeds may be supported if desired, such as using PCIe to connect computing engines together as suggested earlier in an alternate use for the switch.

The QSFP 12 supports hot swapping, thus, port devices can be plugged into or out of the QSFP 12 while power is applied to the port card 3. The TPF 19 is also capable of supporting 100 GbE. A port card 3 with a different front face plate design using a different type of connector 12 other than a QSFP may perform this function. Such a card will have two 100 GbE interfaces 26 per TPF 19, or four per port card. All other connections on the port card 3 may be the same. Port cards 3 consisting of 100 GbE can be plugged into the same positions in a shelf 7 as port cards 3 consisting of slower ports. Port cards 3 plugged into the same port card slot 10 must consist of the same type of interfaces if they are to be hardware redundant to each other. The remaining 46 high speed serial links 27 on the TPF 19 are intended for connections to ICFs 20 on other port cards 3. Two links will go to the port card 3 in the same port card slot 10, one for each ICF 20 on the other port card 3 in its port card slot 10. The others, in groups of four, will go to port card slots 10 in other chassis 1, in the same port card slot 10 position in the other chassis 1. Two links will go the upper port card 3 in the other port card slot 10, and two links to the lower port card 3, again with one link from each set going to a single ICF 20. This arrangement provides a total of twelve chassis 1 in a switch 80, able to support over thirty thousand 10 Gbps ports, or seventy five hundred 40 Gbps ports, or 3000 100 GbE ports, or any combination of the three.

If there are less than twelve chassis 1 in the switch 80, the unused links of the TPF 19 can be connected to unused links of an ICF 20, spread out evenly to the other chassis 1 in the switch 80. All links 27, 28 between TPF 19 and ICF 20 should be connected to enable full bandwidth in the switch 80. Any of these links 27, 28 can be unplugged and connected to another chassis 1 if additional chassis (up to twelve per switch) are to be added without the switch having to be taken out of service. The CMP and SMP will remove all routes over the links to be moved, the links are moved and verified to properly connect to the new chassis, and new routes are allowed to be established after the new chassis is brought on line. The TPF 19 also has fifteen low speed (about 1.4 Gbps) LVDS links 25 between itself and each ICF on its own port card, and up to thirty LVDS links 24 to the other TPF 19 on its port card 3.

Inter-Connecting FPGA Use On The Port Card—The ICF 20 uses 46 of its high speed links 28 for connecting to TPFs 19 on other chassis 1 or to the other port card 3 in its port card slot 10. It also uses LVDS links 25 to connect to the two TPF 19 on its own port card. This is a mirror image of how the high speed links of the TPFs 19 going to the ICF 20 are used.

The ICF 20 uses the remaining 20 high speed serial links grouped as ten redundant pairs 29. Four of these pairs go to the redundant sets of CMPI 4. Identical traffic is sent out over each link 31, which is first identified in FIG. 3, and in theory identical traffic should be received on each link 31 of the redundant pair 29.

One CMPI 4 in each redundant pair will be assigned as the 'active' CMPI 4. Traffic from it will be accepted into the ICF 20. The other CMPI 4 in each redundant pair is the 'standby' CMPI 4. Network traffic from it will be ignored, although the link 31 will be synchronized and ready to take over in case the active CMPI 4 fails. Management traffic from it will still be accepted. This leaves six redundant pairs of high speed links 29 on each ICF 20 that are not connected to anything. These links 29 can be connected to any sort of peripheral the network architects may wish to assign to the chassis. The function of the peripheral is up to the network architects' discretion.

Alternately, multiple switching systems 80 (each consisting of up to twelve chassis 1) may be interconnected over these links 29. The number of ports in such a mega-switch will be a whole multiple of the number of ports available in a single switch 80. Up to seven switches 80 may be interconnected directly resulting in switch 80 clusters with over 210,000 ports of 10 Gbps each. Larger switch 80 clusters can be assembled by using multiple CMPI 4 to interconnect them, including one configuration that provides for 1.9 million ports of 10 Gbps each.

Power and Monitoring on the Port Card—This section is written with regard to power conversion and monitoring being a similar function on all cards developed using this implementation of the design. It applies to the port card 3, the CMPI 4, and for custom designed processors, the CMP 5. It may also apply to peripherals designed to attach to the spare redundant links 29 described above (see Inter-Connecting FPGA Use On The Port Card).

As stated above (see Power Supplies), there are two power busses 22, 23 in the chassis 1, each supplied by a series of N+1 power supplies 2. One power bus 22 goes to the one set of complete power converters 17 for the host card it is on, while the other power bus 23 goes to another complete set of power converters 18. Either set of power converters is sufficient to provide power for the entire host card.

Each set of power converters 17, 18 will need to draw a certain amount of current from their respective power busses 22, 23. A current limiting feature is installed on each power bus 22, 23 at its entrance into the converters 17, 18. This current limiting feature is always ready to engage, limiting startup surge. If the converters 17, 18 draw the maximum amount of current for a period of time longer than what a normal startup period would be, the current limit shuts power to the affected converter 17 or 18 off completely to prevent it from overheating. This also keeps a shorted condition in the power converter 17, 18 from drawing so much current from its respective power bus 22, 23 as to negatively impact the voltage level on it.

Monitoring for all voltages and currents is provided by an Inter-Processor Management Interface (IPMI) 16 sub-system installed on the card. The IPMI 16 monitors incoming voltages and currents 22, 23 and the outgoing voltages and currents of the power converters 17, 18, the temperatures of any integrated circuit with a temperature sensing diode (most FPGAs 19, 20, 30 have such a diode built into them), as well as other temperatures as might be needed. The IPMI 16 communicates with the CMP 5 over a dual redundant IPMI Bus 21 which is electrically identical to the I2C bus. One IPMI bus 21 goes to each CMP 5.

The IPMI processor 16 has a RS-232 monitoring interface 15 that goes out over an RJ-45 connector 13 on the front faceplate of the host card so that a craftsperson can plug a computer into it and communicate with it. Sufficient ESD protection shall be provided on the RS-232 link 15 to prevent damage to the IPMI 16 when a craftsperson that is not properly grounded connects the RS-232 interface from the computer to the RJ-45 connector 13.

Making the Port Cards Redundant—The port card 3 redundancy options are discussed in detail above (see Port Card Redundancy).

Backplane Connector—The port card 3 has a connector 14 to the backplane that interfaces all of the high speed serial IO signals to it. This connector has a density of up to 80 differential signal pairs per card edge inch. The port card has 408 high speed differential signals going off card (there are two differential signals per high speed serial link 27, 28, 29, one for each direction). The port card 3 edge length is about 14" long, so there is plenty of length for the connector. The additional length provides room for external cables that will connect the port card 3 to peer port cards 3 in other chassis 1 to make a multi-chassis switch 80. The connector also has additional signals to support power 22, 23, ground, IPMI bus 21, and configuration pins that help the IPMI processor 16 identify the slot and chassis the port card 3 is plugged into.

Figure 3:
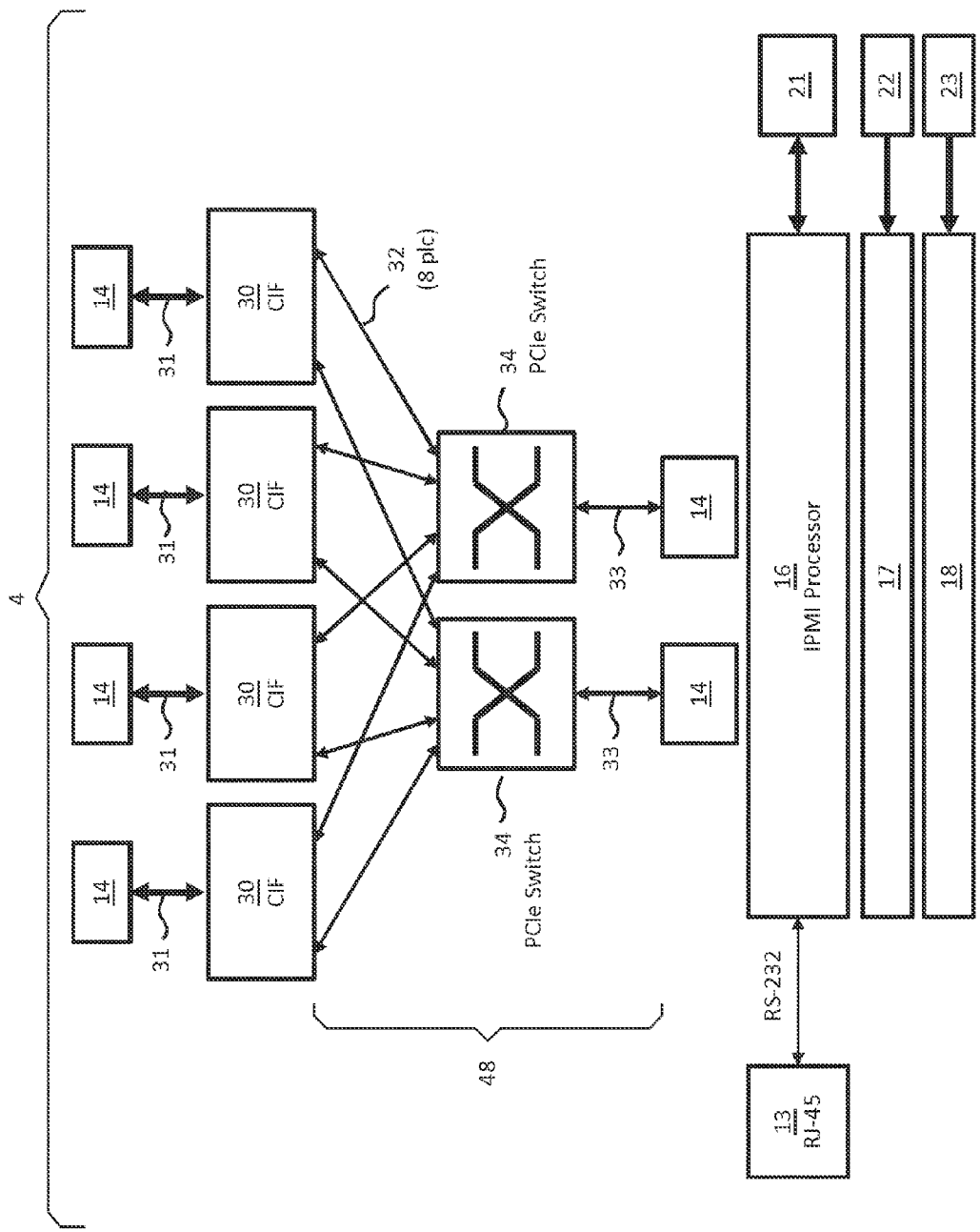
FIG. 3 depicts an embodiment of a switching matrix card that is a daughtercard to the Midplane Chassis Physical Arrangement.

CMP Interface Card—The CMPI 4 architecture is shown in FIG. 3. A primary function of the CMPI 4 is to interconnect the 32 port cards slots 10 in the chassis 1 together. A secondary function is to connect the CMP 5 to the data paths that user traffic flows through, allowing the CMP 5 to manage 'in-band' the chassis 1 ('in-band' relates to management traffic using the same traffic lanes that user traffic is carried on; "out-of-band" relates to management traffic using separate traffic lanes than what user traffic is carried on). The choice of using 'in-band' versus using 'out-of-band' has more to do with costs, power consumption, and other efficiencies rather than as a distinct architectural feature of the invention. Either is acceptable to allow the CMP 5 to manage the chassis 1.

CMP Interface FPGA—The CIF 30 provides the interconnectivity between all 32 port card slots 10. Like the TPF 19 and the ICF 20, the CIF 30 is designed with regard to the Altera Corporation Stratix 5 series FPGA, such as the 5SGXB6 or similar, with 66 high speed serial links. Alternately, the CIF can consist of a smaller Stratix 5 FPGA with a minimum of 34 high speed serial ports. Two of these smaller FPGA may replace each larger FPGA and provide a similar function. The design with the larger FPGA is discussed, but a functional CMPI with either type of FPGA is within the scope of these descriptions.

Sixty four of those links 31 connect to one ICF 20 on each port card 3. The link 31 is one half of a redundant pair 29 on the ICF 20 that has been previously described (see Inter-Connecting FPGA Use On The Port Card). One half of a redundant link 31 from each port card is connected to a CIF 30 on the CMPI 4, and the other half of the redundant link 31 to the peer CIF 30 on the redundant CMPI 4. There are four CIF 30 on each CMPI 4. Each ICF on each port card 3 will be connected to two CIF 30 on each CMPI 4.

CMP Interface FPGA Use on the CMPI—The CIF 30 on each redundant pair of CMPI 4 is connected to the ICF 20 on the port cards 3, with each CIF 30 connected to an ICF 20 on each port card 3 in the chassis. As there are two ICFs 20 on each port card 3, it takes two redundant sets of CMPI 4 to interconnect all of the port cards 3 together.

CMPI Interface to the CMP—Each CIF 30 has two remaining high speed links 32. Each is configured as a single lane Peripheral Component Interchange Express (PCIe) path 32. Ideally running at Generation 3 speeds to maximize the bandwidth through them, although they can run at the lower Generation 2 or Generation 1 speeds if needed. One PCIe path 32 from each CIF is connected to an 8 lane PCIe switch 34, configured as four slave ports of one link each 32 and a master port of four links 33. The master port 33 of one PCIe switch 34 goes to one CMP 5, the master port 33 of the other PCIe switch 34 goes to the other CMP 5. Various links and circuits utilizing PCIe in FIG. 3 are identified as reference number 48.

Power and Monitoring on the Port Card—Power and monitoring on the CMPI 4 in at least one embodiment is identical to that on the port card 3 as described above (see previous Power and Monitoring on the Port Card). Note that due to the identical nature of power and monitoring on both cards 3, 4, the same reference numbers are used.

Backplane Connector—The CMPI 4 has a connector 14 to the backplane that interfaces all of the high speed serial IO signals to it. This connector has a density of up to 80 differential signal pairs per card edge inch. The CMPI 4 has 528 differential signals going off card (there are two differential signals per high speed serial link 31, 33, one for each direction). The connector also has additional signals to support power 22, 23, ground, IPMI bus 21, and configuration pins that help the IPMI processor 16 identify the slot and chassis the port card 3 is plugged into.

Chassis Management Processor—The CMP 5 may consist of any 6U wide processor card chosen by the customer that meets certain industry standards for pin assignments. The minimum architecture that must be supported by the CMP 5 is found in FIG. 4.

Note: The designation of U indicates a distance of 1.75 inches per U minus a single $\frac{1}{32}$nd of an inch (0.031") to allow for tolerances; 6U will therefore be 10.469 inches wide.

Customer Option on Choice of Chassis Management Processor—The customer has the option to select the CMP 5 of their choice. This is provided so that the customer may use their own custom CMP 5 to provide their own secure or proprietary Operating System (OS). Chassis 1 management software can be supplied to the customer to compile it into their own processor 35 on their CMP 5 if needed. Alternately, a default CMP 5 may be used if the customer declines to utilize their own CMP 5.

Exemplary Feature Set of the Chassis Management Processor—In at least one example, there is a minimum set of requirements for the CMP 5.

Processor Core—The processor core 35 contains one or more Central Processor Units (CPU), a cache memory, and an interconnecting bus that interfaces the CPU(s) to all external connections.

Multiple CPUs may exist inside the processor core 35. Each may be tasked with a subset of the management jobs required to keep the chassis 1 operational. A central, coordinating software program running on one of the processor cores 35 will organize and communicate with the other processor cores 35 as needed to keep various software tasks synchronized. A more powerful processor core set 35 may be utilized in a single chassis switch, where the CMP 5 also functions as the SMP 46.

Cache memory is a small memory that can be read very quickly by the processor core 35. Accessing the main memory 38 can involve extensive wait cycles. When information from the main memory 38 is required, a large block of it is read and stored in cache memory. The processor core 35 accesses what it needs from the cache memory, for example over 99% of the time it goes to memory.

Each processor core 35 will typically have its own small cache memory. There may also be a larger cache memory that is shared by the processor cores 35 that is not as fast to access as the small cache, but is still faster to access than the main memory 38. Typically in this memory frequently accessed operating parameters needed by all processor cores 35 are stored.

The processor cores 35 and their individual and common caches are all interconnected to each other through an internal interconnecting bus to the other peripherals attached to the processor core 35.

PCIe Switching—The CMP 5 in at least one example is capable of supporting a five port PCIe switch 44, with each of the slave ports able to support four lanes 33. The slave ports are each connected to one of the CMPI 4. The remaining port in the CMP's PCIe switch 44 is the master port connecting to the processor core 35 on the CMP 5. It is carried over a high capacity PCIe bus 41. Most processor cores 35 now have a high capacity PCIe bus interface on them.

Ethernet Switching—The CMP 5 in at least one example supports a five port 10 GbE ethernet switch 43. This ethernet switch 43 will interconnect the CMPs 5 to each other, and to the redundant SMPs 46. The remaining port is available for port mirroring 47, a useful tool for monitoring port traffic during debugging and troubleshooting, and for connecting an external host processor during software upgrades.

Most processor cores 35 have a high capacity ethernet interface 40 on them.

Non-Volatile Memory—The CMP 5 in at least one example supports a Non-Volatile Memory (NVM) 37, such that contents are not altered when power is removed from the memory. The NVM 37 will be used to provide a boot code that can load the operating system from the HDD 6.

The NVM 37 in at least one embodiment is modifiable. This allows upgrades to the boot code to occur. The NVM 37 interfaces to the processor core 35 through a Boot Code Interface (BCI) 36. Typically the BCI 36 is integrated into the processor core 35 of most high end processors.

Disk Interface—The HDD 6 stores files needed by the CMP 5 to manage the chassis 1. As previously mentioned, there are two HDDs 6 per processor core 35. They may be identical copies of each other, so that if one fails the other can allow the CMP 5 to continue to function. When the CMP 5 updates a file on an HDD 6, it updates the file on both HDDs 6 concurrently. This process is referred to as a Redundant Array of Independent Drives (RAID) and the RAID type is RAID 1, which has two drives with identical files on them. The HDD 6 and its power supply can be replaced with chassis 1 power applied to it. When a new HDD 6 is installed in the chassis 1 the CMP 5 will automatically detect it, format it, and then copy the contents of the working HDD 6 to it to create a redundant copy.

Most processor cores 35 today have two or more high speed Serial Advanced Transport Attachment (SATA) 45 buses to communicate directly with HDDs 6.

Main Memory—A large block of main memory called Dynamic Random Access Memory (DRAM) 38 is provided to store the operating system, operating tables, and other soft operating features of the chassis 1 that can be swiftly accessed by the processor core 35 of the CMP 5. The DRAM 38 has a real time error correcting scheme called Error Code Correction (ECC) which is built into the DRAM interface 39. ECC uses extra memory bits to keep a current account of the parity of all bits in each memory location. DRAM 38, which stores its information content by the presence or absence of a charge on a small capacitor in each memory location, is subject to having the capacitor's charge drained by high energy radiation such as what might be emitted by the sun or inter-stellar sources. Draining these capacitors will change the value of the information stored in them, causing erroneous results. The parity bits, when checked against the parity calculated whenever a memory location is read, will identify single bit and double bit errors if they occur.

Single bit errors can be corrected by comparing the parity bits with the parity generated from the DRAM 38, identifying and inverting the errored bit, and re-writing the results back to DRAM 38 to recharge the capacitor that was inadvertently drained. All of this is done in hardware inside the DRAM I/F block 39 without the supervision of the processor 35. This is typically integrated into the processor core 35 of most high end processors. The DRAM I/F block 39 will keep track of all single bit errors it corrects in a small hardware log until one of the CPUs in the processor core 35 reads the log. Random failures are expected. Repeated random failures in one memory chip indicate the chip is marginal and needs replacing. Consistent errors in one memory location indicate it is bad and needs replacing. If either of these events occur, the CMP 5 can be replaced during a maintenance window.

The storage charge on the capacitors in the DRAM 38 naturally leak and need to be read and re-written on a periodic basis to refresh them before they leak so much that their charge is too weak to be accurately read. These refresh cycles may be used to cycle through the memory and check for, and correct, single bit errors that occur. On many DRAM I/F blocks 39 this can be done independently of the processor core 35.

The DRAM I/F block 39 will inform the processor core 35 of every correction event that takes place. The CMP 5 will notify the SMP 46 that it needs to be replaced after certain thresholds have been reached so the flawed memory component can be removed and replaced.

Monitor Port—A low speed Input/Output (IO) block 42 is connected to the processor core 35. Among the peripheral devices in this IO block 42 is an RS-232 monitor port. This enables a crafts person with a laptop to connect to the CMP 5 and monitor its operation. The monitor port is also modem capable. When connected to a modem, the CMP 5 can be remotely monitored independently of the SMP 46.

Other IO signals found in this block are discrete IO signals, a Serial Peripheral Interface (SPI) interface, and an Inter-Integrated Circuit (I2C) interface. The I2C interface may be used to connect to the IPMI bus 21 that goes to all of the port cards 3 and SMPI cards 4.

Figure 4:
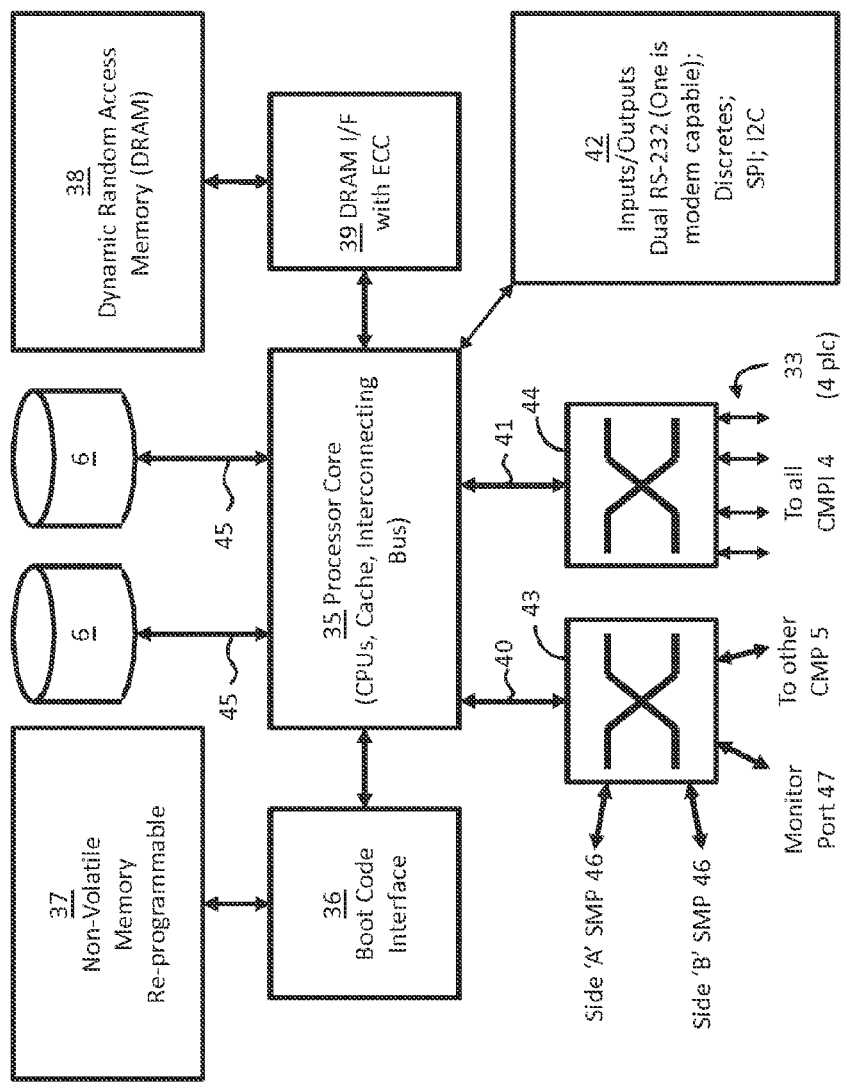
FIG. 4 depicts the minimum architecture of a Chassis Management Processor (CMP) that is a daughtercard to the Midplane Chassis Physical Arrangement.

Power and Monitoring—Not shown in FIG. 4 are the power converters and monitoring features of the CMP 5. These may vary among embodiments and need not all be individually identified here. These features will in one form or another be present and should be utilized to monitor the health of the chassis 1 and the CMP 5. Ideally the CMP 5 will be powered from either power bus 22, 23. As each HDD 6 of the CMP 5 is connected to one or the other of these busses, the HDD 6 power supply can connect its power bus 22, 23 to the CMP 5 with current limiting features built in so that if the power converters on the CMP 5 short out they will limit the current enough to keep the voltage on the affected power bus 22, 23 from dropping too low.

Figure 5:
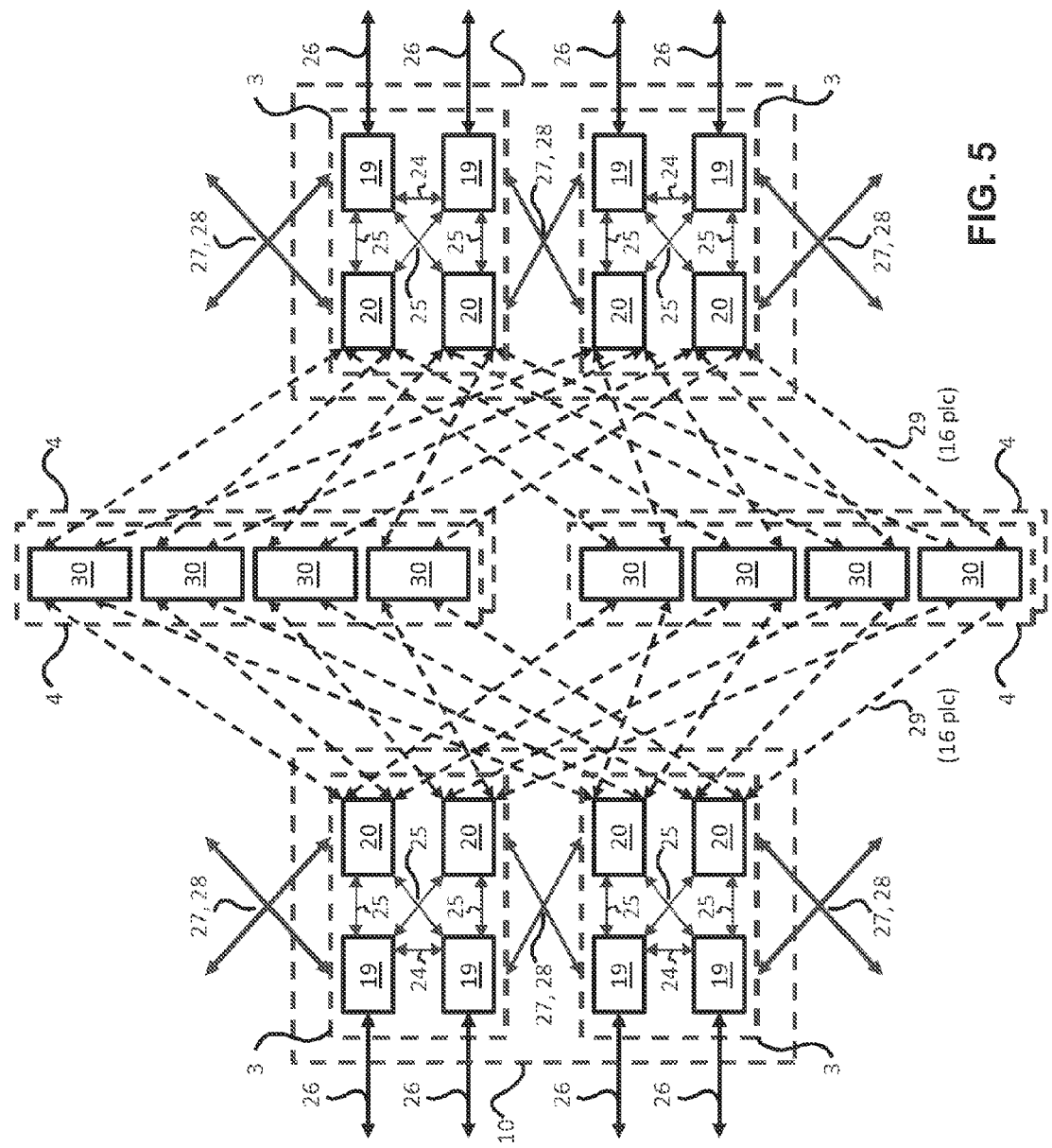
FIG. 5 depicts an embodiment of port card Interconnectivity to the switch matrix card.

Detailed Traffic Connections—Regarding port cards 3 and the CMPI 4 outlined the connections between them, this section will consolidate those connections to provide a clear picture of how customer traffic paths through the chassis 1 are organized. FIG. 5 shows the interconnections of the high speed serial links 24, 25, 26, 27, 28, 29 from the incoming port 26 through the CMPI 4 to the outgoing port 26. FIG. 5 relates to data path connections inside the chassis 1.

Connections Between Cards In A Chassis—There are thirty two port card slots 10 in a chassis 1. In FIG. 5, only two are shown for clarity, one on the left and one on the right of FIG. 5. There is no direct connection between port card slots 10 in the same chassis 1. To interconnect the port card slots 10 together, the CMPI is used. FIG. 5 shows all four CMPI 4 in the chassis 1 as two redundant halves, with one redundant pair on the bottom between the two port card slots 10 and the other redundant pair on the top, also between the two port card slots 10.

From the CMPI 4 there are two connections to each CIF 30 from each port card slot 10, one from each port card 3 in the port card slot 10. The connections are from the ICF 20 in each port card slot 3 only; the TPF 19 does not connect to the CIF 30. The connections 29 from the ICF 20 to the CIF 30 are two redundant links 31. The detail separation of these links 31 are not shown in FIG. 5. One link 31 from each redundant pair 29 will go to a CIF 30 on one CMPI 4, the other link 31 from each redundant pair 29 will go to the peer CIF 30 on the redundant mate of the CMPI 4, which is shown as a second dashed block behind the first dashed block on the top and again on the bottom of the FIG. 5.

There additionally are control connections between the CMPI 4 and the CMP 5. These are not shown in FIG. 5. Referring to FIG. 3, via a single lane PCIe bus 32, the four CIF 30 on each CMPI 4 are connected to a PCIe switch 34, which present a single PCIe port 33 to the CMP 5. One such port 33 is connected from each CMPI 4 to each CMP 5, as is shown in FIG. 4.

Connections Between Chassis—Chassis 1 are connected together between port card slots 10. A port card slot 10 in one chassis 1 will be connected to its peer port card slot 10 in all of the other chassis 1 of the switch 80. A link 27 from the TPF 19 in one chassis 1 will be connected to a link 28 from the ICF 20 in another chassis 1. As described above, there are forty six links 27 on each TPF 19 and on each ICF 20. Two will go to the peer port card 3 in its port card slot 10. This is shown in FIG. 5 in the middle of each port card slot 10 using the thinner solid bidirectional arrows 27, 28 that cross each other. The other 44 links 27, 28 from each FPGA 19, 20 on each port card 3 will, in groups of four, go to up to eleven other chassis 1.

See FIG. 5 for the connecting links between a port card slot 10 and another chassis 1. The connections are the thick solid bidirectional arrows crossing each other at the top and bottom of each port card slot 10. Each TPF 19 will use one of its remaining 44 links 27 to connect to each of four ICF 20 in the port card slot 10 on each of the other chassis 1. It takes 4 links 27 from each TPF 19 and 4 links 28 from each ICF 20 to connect to each chassis 1.

Figure 6:
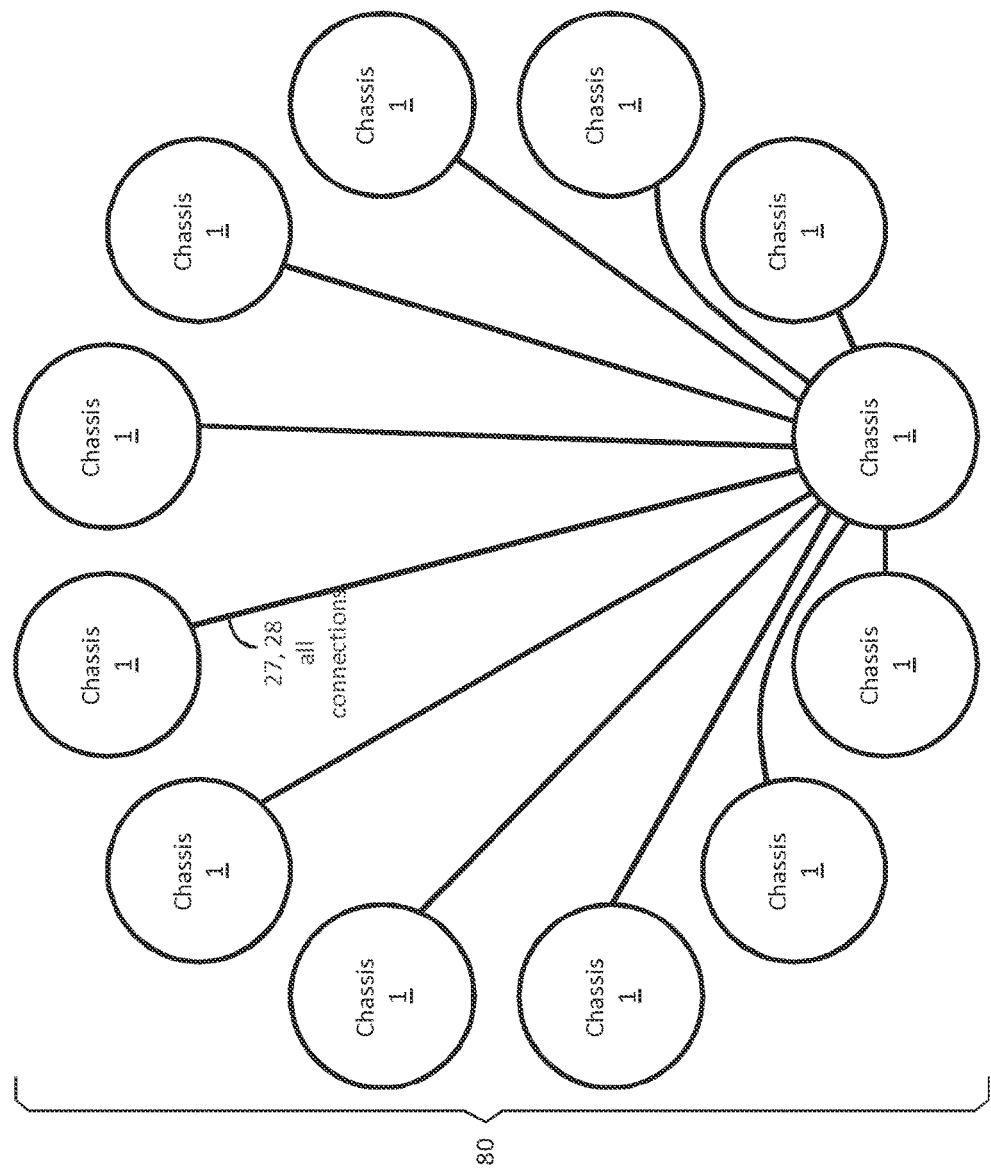
FIG. 6 depicts an embodiment of Data Paths Interconnecting different chassis (or 19" wide frame relay racks) of the switch.

As is shown in FIG. 6, which shows connections from one chassis to all others in a switch, the chassis 1 are all connected by connections 27, 28 to each other. All eleven sets of connections 27, 28 to/from a chassis 1 are shown for one chassis only 1 to reduce clutter in FIG. 6. Every chassis 1 shown in FIG. 6 has the same connections to all other chassis 1. This provides a crisscrossing or spider-web type of arrangement of connections. Each line shown in the FIG. represents sixteen set of four links 27, 28 going to and from each port card slot 10 in the chassis 1. This is repeated for all thirty two port card slots 10 in each chassis 1.

In switches with fewer than 12 chassis, some connections between chassis will involve multiple sets of connections. These must be connected to ensure there is sufficient internal bandwidth to interconnect all port cards 3 together.

Internal Datagram—Internal datagrams are the collection of data sent from a datagram source to a datagram destination inside the switch 80 and chassis 1. Most datagrams will be user traffic, and will originate at the receiving port 66 on a TPF 19. Other datagram sources include the embedded CPU 73 inside an FPGA 19, 20, 30 or the CMP 5. Datagram destinations are the outgoing port 71, the embedded CPU 73 (see FIG. 9, FIG. 10, and FIG. 11) inside an FPGA 19, 20, 30, or the CMP 5.

Internal datagrams of the switch are 64 bytes in size. Making the datagrams a fixed size enables the hardware to respond in a repeatable and deterministic fashion to the transmission, reception, and switching of datagrams.

Types of Datagrams—There are four generic types of datagrams. Their structure is identified in FIG. 7 and FIG. 8. The four types of datagrams are: 1) First datagram of a multi-datagram packet; 2) Continuation or middle datagram of a multi-datagram packet; 3) Final, ending, or last datagram of a multi-datagram packet; and 4) Only datagram of a packet.

Figure 7:
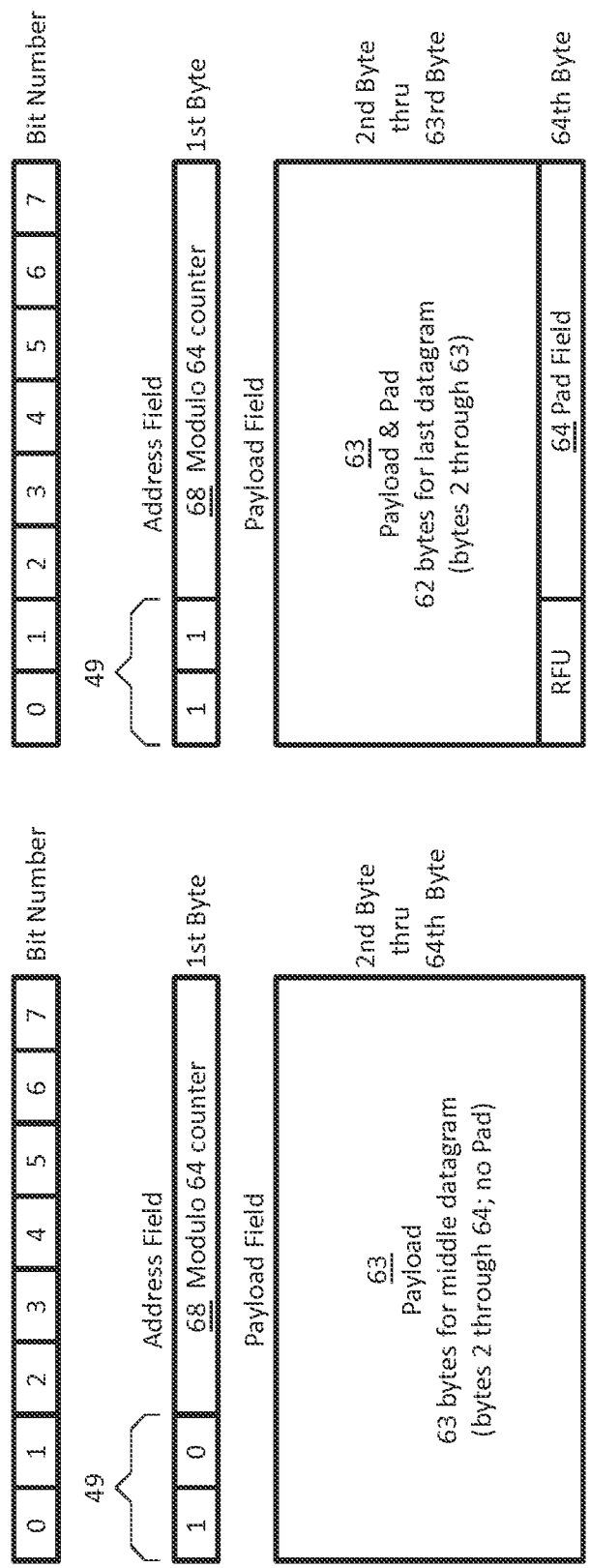
FIG. 7 depicts an embodiment of the internal data packets, referred to herein as datagrams to distinguish them from external packets, showing the organization of the continuation and last datagrams of a multi-datagram packet.
Figure 8:
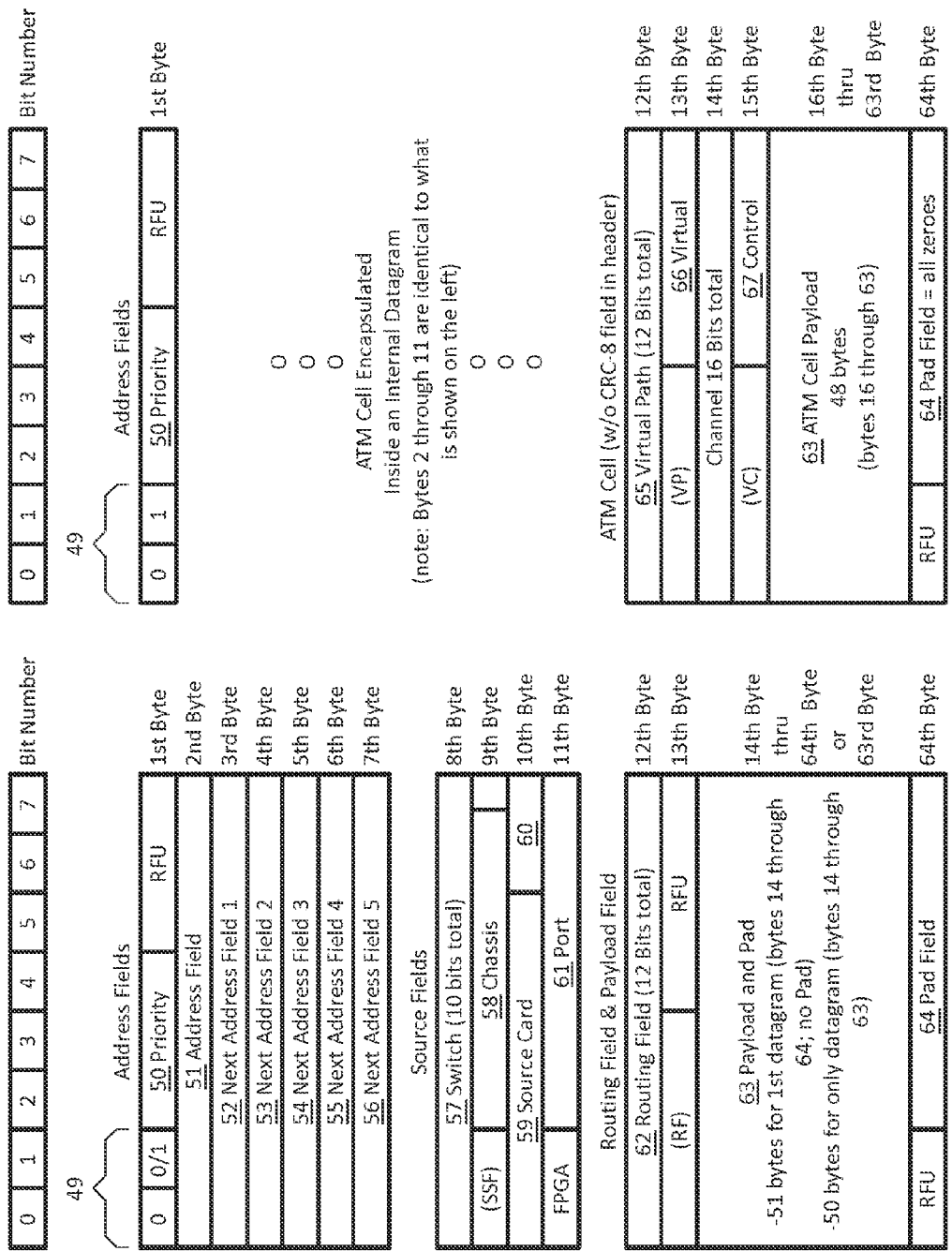
FIG. 8 depicts an embodiment of the datagram, showing the organization of the first datagram of a multi-datagram packet, or the only datagram of a packet, including a specialized implementation for carrying ATM cells.

The datagram type is identified by the Type Field (TF) 49, and is identified in both FIG. 7 and FIG. 8. The values are specified in Table 1.

TABLE I

Definition of Type Field 49 In the Internal Datagram

| Type Field 49 Bit 0/Bit 1 | Datagram Type | Number of Fields | Datagram is shown in |
|---|---|---|---|
| 0 0 | First Datagram of a Multi-datagram packet | 17 | FIG. 8 |
| 0 1 | Only Datagram of a packet | 18 | FIG. 8 |
| 1 0 | Middle Datagram of a Multi-datagram packet | 4 | FIG. 7 |
| 1 1 | Last Datagram of a Multi-datagram packet | 5 | FIG. 7 |

The bits' organization of the Type field 49 is designed to provide uniformity in the datagram type definitions. Bit 0: when zero indicates the datagram has address fields, source fields and routing fields; when one indicates the datagram does not have address fields, source fields, or routing fields. Bit 1: when zero indicates the datagram is the not the final (or only) datagram of a packet; when one indicates the datagram is the final or only datagram of a packet.

External packets that are encapsulated inside a datagram are either small enough to fit into a single datagram, or they are not. If they are small enough, they will be encapsulated inside an 'Only Datagram of a Packet' type of datagram. External packets that can be encapsulated into an 'Only Datagram of a Packet' are 50 bytes in size or smaller.

Note: ATM cells, which are 52 bytes in size after the CRC-8 field is removed from the header, can also be encapsulated in an Only Datagram of a Packet. The first two bytes of the ATM cell header correspond with Routing Field (RF) 62 and the 4 bit RFU field that follows it which is found in the only datagram of a packet. This is outlined in more detail in FIG. 8. These fields normally do not carry payload, but when used to carry ATM cells, they also carry payload, allowing the 'Only Datagram of a Packet' to carry a 52 byte ATM cell.

If an external packet is too large to fit inside the payload of an Only Datagram of a Packet then the external packet is split up. To be too large it must be 51 bytes or larger in size. ATM cells are an exception. Since their first two bytes correspond to the Routing Field 52 they can be 52 bytes in size and fit within an Only Datagram.

The first 51 bytes of the packet are placed in a First datagram of a multi-datagram packet. If there are between 0 and 62 bytes remaining, they are placed in a subsequent Last datagram of a multi-datagram packet. If there are 63 or more bytes remaining, in 63 byte chunks, the packet is placed in a series of Middle or Continuation Datagrams of a multi-datagram packet until there are less than 63 bytes remaining. The balance of the remaining bytes are placed in a last datagram of a multi-datagram packet. It is quite possible for the last datagram to have a pad value of 62, indicating there are no packet bytes in it.

It is worth noting that a multi-datagram packet stays together as it travels through the chassis 1 or switch 80. The middle and last datagrams of the packet do not have routing information in them. They have to be routed the same way that the first datagram of their multi-datagram packet is routed, so they must stay together.

Datagram Transmission—Datagrams are transmitted bit 0 first, and are preceded by an inter-datagram sequence that identifies the start of a datagram. Once a datagram transmission begins, it is not interrupted. Once a multi-datagram transmission begins, it is not interrupted.

The chassis 1 has approximately two to three times as much bandwidth on its internal links 24, 25, 27, 28, 29 as the ports 26 have. It should not necessary to implement exotic protocols to maximize the use of internal bandwidth. An easy to implement subset of Altera's FPGA protocols such as Serial Lite II or Interlaken may be sufficient.

Datagram Definition—The number of fields inside a datagram are identified in Table 2 1. FIG. 7 and FIG. 8 show the fields and their organization in the datagrams. FIG. 7 shows an organization of the middle and last datagram types. The left half of FIG. 7 is an organization of a Middle or Continuation Datagram, while the right half is an organization of a Last Datagram.

FIG. 8 shows organization of the first and only datagram types. The left half of FIG. 8 is a generic representation of a first datagram and an only datagram. A difference is the 2nd bit of the TF 49, and the existence of a Pad Field 64 as the last byte for the Only Datagram type of datagram. The First Datagram type has no pad field, the 64th byte carries user data. The right half of FIG. 8 is an implementation of the only datagram when an ATM cell is encapsulated in it.

Interior nodes and ports do not need to concern themselves with what type of data is encapsulated inside the datagram. If the datagram is mis-delivered, it contains enough information for the node that drops it to let the CMP 5 know where it began when it gets dropped.

Datagram Definition—First Byte—The first two bits of the first byte are the TF 49, which has already been described. The definition of the balance of the first byte of a datagram will vary depending on whether it is a first or only datagram, or a middle or last datagram. For the first or only datagram, the next field is the Priority Field (PF) 50. It is three bits wide, and is used to determine what queue the datagram will reside in while waiting to be transmitted from a Queuing Buffer 72 (a Queuing Buffer 72 is first seen in FIG. 9). The field definition is specified in Table 2.

TABLE II

Priority Field 50 Bit definitions

| 1st Byte Bit Position 2 3 4 | Definition |
| --- | --- |
| 0 0 0 | Overhead or command and control datagrams |
| 0 0 1 | Real time, delay sensitive datagrams (i.e., interactive voice or video) |
| 0 1 0 | Near-real time datagrams (one way live transmission of time critical data) |
| 0 1 1 | Not used. If detected, defaults to 0 1 0 |
| 1 0 0 | Non-real time data, high priority traffic |
| 1 0 1 | Not used. If detected, defaults to 1 0 0 |
| 1 1 0 | Non-real time data, low priority traffic |
| 1 1 1 | Filler datagram (used to keep links sync'd but is dropped at receiver) |

The last three bits of a first or only datagram are unused, and are Reserved for Future Use (RFU). They will default to all zeros but will be transmitted with whatever values are found in them. They will be ignored in at least some embodiments, including the example provided.

For the middle or last datagram of a multi-datagram packet, the last six bits of the first byte are a modulo 64 bit counter 68. Starting with the value of all zeros, this counter 68 counts up for each successive datagram of a multi-datagram packet the receiving port generates. It goes back zero after reaching a count of 63. If a sequence skip occurs, including a missing last datagram, then the entire multi-datagram packet is dropped. A missing last datagram event occurs if another first datagram or an only datagram occurs before the last datagram.

Filler datagrams are special instances of only datagrams. They are generated when there are no datagrams to be transmitted just to keep the line synchronized at the receiving end. When received, they are ignored. All bits after the first byte are an alternating pattern of 1's and 0's to provide the maximum number of edges to easily enable the receiver of the path to sync up and stay synchronized to the transmitter.

Datagram Definition—Address Field—For first or only datagrams the 2nd byte is the Address Field (AF) 51. The AF 51 points to the egress port of the Switching Engine (SWE) 69 the datagram is about to be switched through. The AF 51 has three reserved values. One value indicates that the datagram will be routed using the RF 62 or VP 65 as a 12 bit pointer into a control memory which points to the egress port(s) of the SWE 69.

The second value is the address of the embedded CPU inside a node.

The other value indicates that the datagram (and all its following datagrams of a multi-datagram packet) is to be dropped and an error message sent to the CMP 5 for analysis. The purpose behind this is to provide a mechanism that limits the number of SWE 69 a datagram can pass through before it is assumed that the datagram was mis-routed. As a datagram passes through each SWE 69 the AF 51 is filled with the contents of NAF1 52. NAF1 52 is filled with the contents of NAF2 53, etc. NAF5 56 is filled with the special value that caused the datagram to be dropped. If that value works its way to the AF 51 then the datagram has been misdirected and is dropped to keep it from indefinitely circulating inside the chassis 1 or switch 80.

Datagram Definition—Next Address Fields—The third through seventh byte of the first or only datagrams are the Next Address Fields (NAF1 through NAF5) 52, 53, 54, 55, 56. They are used to store the subsequent addresses of the egress fields of the SWE 69 the datagram is passed to as it traverses the chassis 1 and switch 80. As described above (see Datagram Definition—Address Field), their contents keep shifting towards the AF 51 one field at a time as the datagram travels from SWE 69 to SWE 69.

Note: Some egress points pointed to by the AF 51 are not on the SWE 69 the datagram is in, but in one of the next SWE 69 downstream. In that instance, the SWE 69 will route the datagram to its egress point that feeds the downstream SWE 69 without shifting the contents of the AF 51 and NAFx 52, 53, 54, 55, 56.

Datagram Definition—Source Identifier Fields—The first datagram and only datagrams types have five fields 57, 58, 59, 60, 61 in them that identifies the source of the datagram. Datagram sources are incoming ports 26, the FPGA or ASIC's embedded CPUs 73, or the CMP 5. They are uniquely identified by examining the contents of these field fields. These five fields are a total of 4 bytes in size. In the current implementation of the invention, there is room for growth in several of these fields. These fields are captured by the embedded CPU 73 and along with the reason why the packet was dropped, sent to the CMP 5 to be analyzed if there was a problem with any of the datagrams in the packet (misdirected, sequence number error, etc.). When an error message is generated and sent to the CMP 5 by the embedded CPU 73 in the FPGA 19, 20, 30 the contents of these fields is included. The five fields are further detailed below.

Switch Source Field (SSF) 57—Identifies the switch 80 in a multi-switch cluster. This field is 10 bits in length and can identify up to 1024 different switches 80 in a multi-switch cluster.

Chassis Source Field (CSF) 58—Identifies the chassis 1 in a multi-chassis switch 80. This field is 5 bits in length and can identify up to 32 different chassis 1 in a switch 80.

Card Position Source Field (CPSF) 59—Identifies the card 3, 4, 5 position within the chassis 1. This field is 7 bits in length and can identify up to 128 different card positions 3, 4, 5 within a chassis 1.

FPGA Source Field (FSF) 60—Identifies the FPGA 19, 20, 30 on the card. This field is 4 bits in length and can identify up to 16 different FPGAs on a card 3, 4, 5. Note that the FPGA may also be an ASIC. The FPGA or ASIC 19, 20, 30 are the nodes located throughout the switch.

Port Source Field (PSF) 61—Identifies the port in the FPGA 19, 20, 30 that is the datagram source. The PSF will include the FPGA's internal CPU 73 or the IMPI's 4 PCIe port 34. This field is 6 bits in length and can identify up to 64 different ports in a node.

Datagram Definition—Routing Field—The RF 62 consists of 12 bits that help identify the destination(s) of the datagram. This corresponds directly with the Virtual Path (VP) 65 field of the ATM cell that is encapsulated in an only datagram. For encapsulated packets other than ATM cells, this field is appended with 4 bits to take it out to two bytes in size. These bits are unused and should be all zeros. Any value found in them will be ignored but passed through without modification. For this reason, the SWE 69 can pass ATM cells or any other type of payload without knowing what the datagram is carrying.

Datagram Definition—Payload—The PayLoad Field (PLF) 63 carries the encapsulated packet. All four types of datagrams have a payload field. The PLF will consist of actual data plus the pad data as specified in the Pad Field 64 of the Only or Last datagram types.

Datagram Definition—PAD Field—The Pad Field 64 specifies a count of how many bytes of the PLF 63 of the final datagram or only datagram are not needed to carry the balance of the packet encapsulated by the datagram(s). Pad Field 64 values can be from 0 to 61 for the last datagram of multi-datagram packet, and 0 to 31 for the only datagram of a packet, or 0 for ATM cells. Invalid Pad Field 64 values default to a pad size of 0. The Pad Field 64 is the last byte of the datagram. As the two upper bits of the Pad Field 64 will never be used, they can be set aside for future use. Their contents are generated as all zeros. Whatever value is found in them will be passed through unchanged. They will be ignored in at least some embodiments, including the example provided.

Routing of Internal Datagrams—Internal datagrams are routed by one of two means as it passes through each SWE 69. When the datagram is not to be duplicated, then the AF 51 identifies the egress port of the SWE 69 the datagram is about to pass through. If the datagram is destined for multiple egress ports of the SWE 69, then a control memory addressed by the 12 bit RF 62 or VP 65 of the ATM cell points to the actual egress port(s) of the SWE 69. When more than one egress port is identified on the output of the SWE 69, the datagram gets duplicated by being received by multiple egress ports. Note that after duplication, even if the datagram is not to be subsequently duplicated again further downstream, it should be routed by the RF 62 since the different copies of each datagram may go to different physical address egress points of SWE 69 that they pass through. In that case it is not possible to use a physical address anymore as at least one datagram will get misrouted.

For multi-datagrams packets, all datagrams stay together throughout the entire chassis 1 or switch 80. When the first datagram enters an SWE 69, no matter how high the priority of other datagrams at other ingress points to the SWE 69, the SWE's 69 top priority is to passing the rest of the multi-datagram packet through. By keeping datagrams together, it accomplishes three things related to resource efficiency:

(1) The header fields are not needed for middle and final datagrams of a multi-datagram packet. This means that the inefficiencies of overhead consumed by the header not wasting bandwidth in the balance of the multi-datagram packet, and (except for the first byte, or the pad size field of the final datagram) over 98% of the middle datagrams can carry payload.

(2) If a multi-datagram packet is to be dropped either due to congestion or error, by keeping it all together it is easy to do so.

(3) At the transmitting port, it is not necessary to ever have to keep track of receiving bits and pieces of several multi-datagram packets concurrently. Only one will be received at a time.

FPGA Architectures—This section identifies the function of the individual blocks 66, 67, 68, 69, 70, 71, 72, 73, 74, 75, 76 within the FPGAs.

Figure 9:
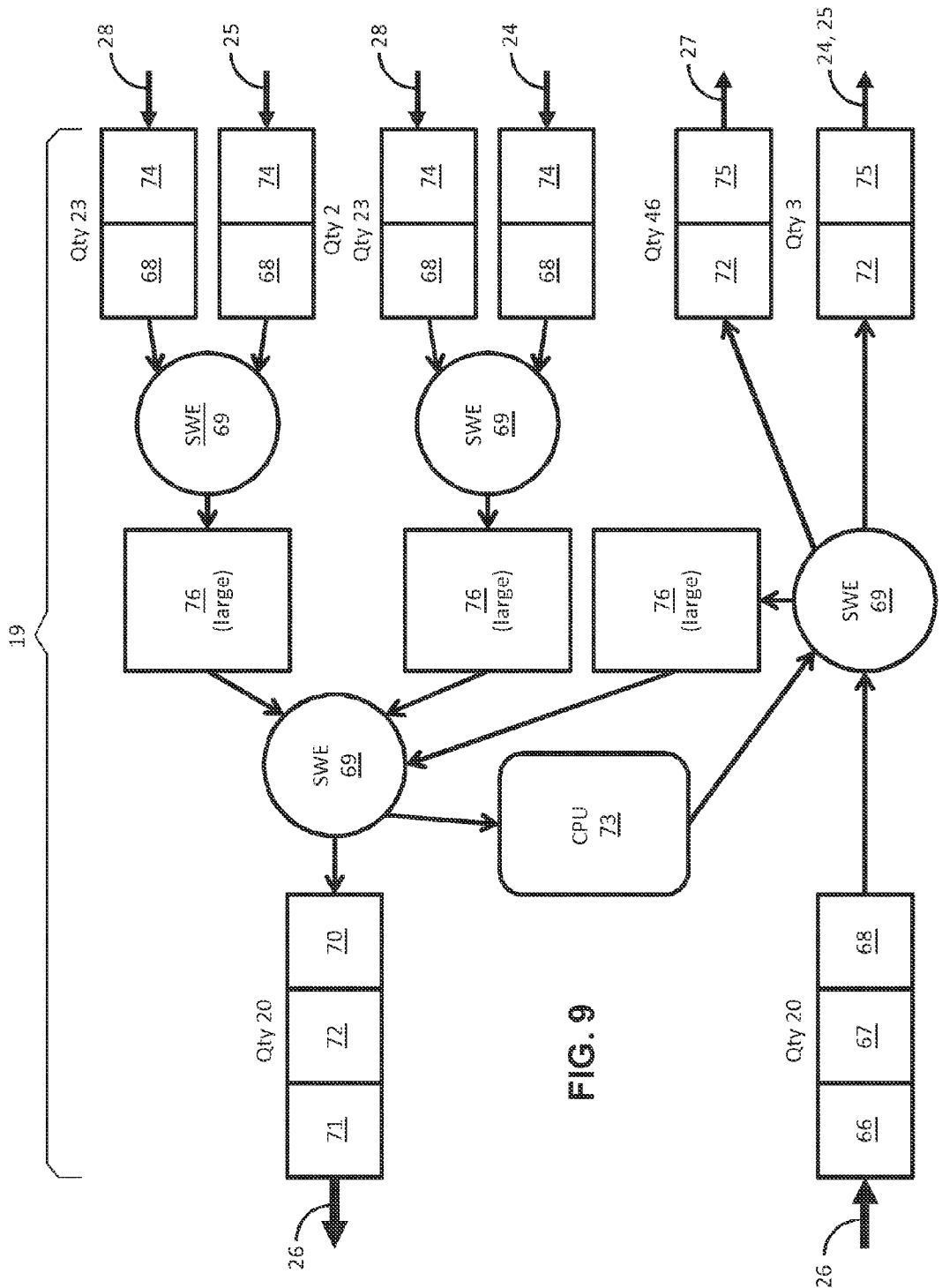
FIG. 9 depicts an embodiment of Data Paths and Functional Blocks Inside a Telecom Port FPGA.

Telecom Port FPGA—The TPF 19, the architecture of which is shown in FIG. 9, includes the following blocks: Receiver, Framer, Deserializer (RFD) 66; Packet Lookup Engine (PLE) 67; Holding and Queueing Buffers 68, 72, 76; SWE 69; Packet Reassembly Engine (PRE) 70; Telecom Port Transmitter (TPT) 71; embedded CPU 73; Datagram Receiver (DgR) 74; and Datagram Transmitter (DgT) 75.

Telecom Port FPGA Architecture—The overall flow of received traffic can be followed in FIG. 9. Incoming traffic 26 enters the TPF 19 in the lower left corner at the RFD 66, is received, synchronized, converted to parallel format, and identified by the PLE 67. It is stored in a Holding Buffer 68 until the SWE 69 in the bottom of FIG. 9 can switch it. There are two possible destinations; inside the TPF 19, in which case the traffic gets routed to the large Holding Buffer 76 on the egress of the bottom SWE 69, or else outside the TPF 19, in which case the traffic gets routed to the Holding Buffer 72 in front of one of 46 different high speed links 27, the set of LVDS links 24 to the other TPF 19 or one of two sets of LVDS links 25 to the ICF 20 on the same port card 3 the TPF 19 is on. When it leaves the TPF 19, the datagrams is encapsulated in a Serial Lite II or Interlaken protocol envelope (that is free of charge from Altera Corporation) by the DgT 75.

Traffic going to the outgoing port 26 in the upper right corner either comes from one of the TPF's 19 own incoming ports 26, or else it comes to the TPF 19 from outside the TPF 19. It can come from its peer TPF 19 over LVDS links 24 or from the ICF 20 on the same port card 3 over LVDS links 25, or it can come from an ICF 20 on another port card 3 over high speed serial links 28. Note that the links 28 from other ICF 20 are the receiving side of the high speed links 27 that go to the ICFs 20 on other port cards 3.

Once traffic destined for the outgoing port 26 of the TPF 19 is stored in one of the large Holding Buffers 76 the SWE 69 in the top left portion of FIG. 9 will sequentially switch multi-packet datagrams (or an only datagram) from each large Holding Buffer 76 on an equal priority basis. The packet is extracted and assembled at the PRE 70, placed in a Queuing Buffer 72 and finally converted into serial format and shipped out with the corresponding protocol's overhead from the TPT 71.

Datagrams for the embedded CPU 73 come into the TPF 19 just like other datagrams from outside the TPF 19, but at the final SWE 69 instead of routing the datagram to one of the PRE 70 it is routed to the embedded CPU 73. When it leaves the CPU 73 it goes back into the internal network of the chassis 1 much like any another datagram received on one of the incoming ports 26.

In the upper right hand corner of FIG. 9 are two nearly identical sections, composed of DgR 74, Holding Buffer 68, the SWE 69, and a large Holding Buffer 76 on the SWE 69 egress port. Two copies are shown as the amount of traffic that may enter the TPF 19 from the links 24, 25, 28 can for short periods of time exceed the capacity of one SWE 69, causing the traffic to back up in the Holding Buffer 68 to the point where the Holding Buffer 68 overflows. By using two SWE 69 bursty traffic on several links can be transferred to the larger Holding Buffer 76 on the egress ports of those SWE 69 without it filling up in the Holding Buffers 68 on the ingress ports of the SWE 69.

Telecom Port Utilization—There are twenty links 26 dedicated to incoming and outgoing telecom or data traffic. Combined they can carry up to 200 Gbps in each direction (this limitation is based on the port protocol of either ethernet or SONET; the ports are capable of carrying more traffic than that if different protocols are used). The individual links 26 can carry SONET protocols up to OC-192, ethernet protocols of 10 GbE, or other similar capacity connections. In groups of four, the links 26 can be combined into an OC-768 or 40 GbE. In groups of ten, the links 26 can be combined into 100 GbE. The links may also support PCIe or other existing high speed protocols not mentioned. Future implementations of other protocols are also possible.

There are twenty copies of the groups of three incoming blocks 66, 67, 68 and the three outgoing blocks 70, 71, 72 on the far left side of FIG. 9, one for each link 26 dedicated to the port. There is little difference in the organization of the blocks whether they support 20 independent ports of 10 Gbps each, five ports of 40 Gbps, or two ports of 100 Gbps each.

Incoming Port—The RFD 66 receives the incoming serial data stream 26 and searches for framing patterns. When the framing pattern is detected and synchronized, the incoming bytes for the packet (ethernet packet, ATM cell, or other protocol that is programmed into the FPGA 19) are de-serialized and sent to the PLE 67 for identification.

The PLE 67 has an address lookup mechanism that will look at the 32 bit destination address of Internet Protocol Version 4 (IPv4) or the upper 64 bits of the destination address of the Internet Protocol Version 6 (IPv6) and run it through a binary searching mechanism that looks for a match among 4096 possible entries. If a match is found the routing information associated with that match is placed in the header of a first datagram or only datagram and the packet is routed through the chassis 1 or switch 80. If the packets are ATM cells then the VP 65 provides a 12 bit address into a 4096 deep lookup table to find the routing information for the cell. If no match is found, the packet is routed to the CMP 5 for address resolution. The CMP 5 will then send instructions to the embedded CPU 73 of the TPF 19 the packet was received on and add internal routing information to the address lookup mechanism. Sometimes the CMP 5 will identify the packet as unacceptable, and when received in the future the packet will be identified so that it may be deleted without further involvement of the CMP 5.

The PLE 67 is able to process at 10 GbE the repeated reception of the smallest IPv4 ethernet packets without overflowing. This will be the minimum size 28 bytes for IPv4 packets. This is a combination of the sync (1 byte), preamble (7 bytes), and header (20 bytes). For 40 GbE and 100 GbE the same logic is used with the PLE 67 of four ports set or ten port sets to search the destination address on a staggered basis. IPv6 headers are bigger, so they cannot be received at a faster rate than the smallest IPv4 headers can be received.

ATM cells are easier to process. The VP field 65 contains a 12 bit address that points to one of 4096 possible entries over which the cell can be routed after it is encapsulated in a datagram. If an entry is not used, then the entry in the lookup table will route the cell to the CMP 5 for address resolution. ATM cells can be processed through the 4096 entry lookup table faster than they can be received, so they cannot overflow the PLE 67.

Holding Buffers—The holding buffer 68, 72, 76 comes in two sizes; 512 datagrams 68, 72 and 2048 datagrams 76. In the FPGA block diagrams, the 2048 datagram Holding Buffer 76 are drawn physically larger, and have the word "large" below their identifying number. In the Altera Stratix 5 FPGA, the smaller Holding Buffer 68 is able to hold more than two jumbo frames (10,000 byte IP packets) before overflowing.

The first Holding Buffer 68 the incoming packet encounters is adjacent to the PLE 67. It holds all the datagrams of a packet until the packet is received in its entirety, and then flags the SWE 69 that a packet is ready to be switched. The only differences between a holding buffer 68 on the ingress of an SWE 69 and the special holding buffer known as the queuing buffer 72 on the egress of the SWE 69 is 1) that the ingress holding buffer 68 must have an additional bit in it for each egress port of the SWE 69, 2) the queuing buffer 72 is logically or physically divided into multiple buffers so higher priority traffic can be placed in its own buffer to get through faster while lower priority traffic waits. Due to resource limitations in the Altera Stratix 5 FPGA, the queuing buffer 72 will be a single memory divided into multiple logical buffers.

Switching Engine—The SWE 69 routes a packet encapsulated in one or more datagrams to all egress points of the SWE 69. Only those egress points addressed by the first or only datagram will accept the datagrams, the others will ignore it.

Once a SWE 69 begins transmitting the first datagram of a multi-datagram packet from a holding buffer on one of its ingress points, it will continue to do so until the last datagram of the multi-datagram packet has passed through it. To do this the egress point(s) extracted from the first datagram doesn't change as the remaining datagrams of the multi-datagram packet pass through it. The SWE 69 will query the other ingress points for an available packet to pass through it, and have that ingress point ready so there are no unused datagram switching times wasted going from ingress point to ingress point.

One feature of the SWE 69 is that on each egress point, there is the option to replace the 12 bit VP 65 or RF 62 with a new value. The replacement is done on the egress point since a duplicated datagram may require different values as the two copies are routed differently through the rest of the transit to their respective outgoing port 26. The replacement field is a 4096×12 memory whose contents are modifiable by the embedded CPU 73. A separate field exists for each egress point on the SWE 69. Note that this field replacement is optional.

In the Altera Stratix 5 FPGA, the SWE 69 can operate at 600 million datagrams per second. At this rate it can keep up with the received rate of repeated copies of minimum sized packets on the IPv4 protocol on all twenty incoming ports 66. ATM cells and the minimum sized IPv6 packets will come in at a slower rate than the minimum sized IPv4 packets, so they will not overload the SWE 69.

Queuing Buffer—The Queuing Buffer 72 is the same physical size as the smaller Holding Buffer 68 but it is logically broken up into three buffers. The first buffer holds a small number of datagrams and is dedicated to carrying internal management traffic (the PF 50 value is 000) or real time traffic (the PF 50 value is 001). The actual number of datagrams will vary depending on traffic simulation and analysis. The second buffer is able to hold a small number of datagrams and is dedicated to carrying near real time traffic (the PF 50 value is 010 or 011). The actual number of datagrams will vary depending on traffic simulation and analysis. The third buffer hold the balance of the 512 datagrams the entire buffer is capable of holding, but must be kept large enough that it can carry two IP Jumbo frames or whatever maximum packet size the chassis 1 or switch 80 is intended to carry. It is dedicated to carrying non-real time traffic. It makes no distinction between high priority traffic or low priority traffic until it is about 75% full; then, it will not accept any more low priority traffic until it is at least 50% empty. There is one Queuing Buffer 72 for each link 24, 25, 27 going to an ICF 20. Note that the LVDS channels 24, 25 are organized so that multiple channels are in a single link.

Datagram Receiver—The DgR 74 accepts datagrams from an external link. In this implementation example, it is always an ICF 20 or the TPF 19 on the same port card 3. There is one DgR 74 for each high speed serial link 28 and one DgR 74 handling multiple channels for each LVDS link 24, 25. The DgR 74 is similar in operation to the RFD 66 and the PLE 67 but only processes internal connections. Since datagram lookup is extremely easy for internal datagrams, a complicated mechanism like the PLE isn't necessary. The DgR 74 will identify the egress points of the SWE 69 the datagram will be switched through, and it will contain a flag that indicates whether or not the RF 62 or VP 65 needs replacing at the egress port of the SWE 69. Note that the two SWE 69 on the far right of the TPF 19 in FIG. 9 only have one egress point. For this reason the egress points identified by the DgR 74 are not applied at either of these SWE 69, but are stored with the large Holding Buffer 76 and applied at the next SWE 69.

Packet Reassembly Engine—The PRE 70 collects and reassembles multi-datagram packets before placing them in a queuing buffer 72 prior to transmission. It can re-assemble packets at a rate of 600 million datagrams per second, therefore it can keep up with the SWE 69 feeding it and does not need an input buffer.

Telecom Port Transmitter—The TPT 71 takes a packet stored in the queuing buffer 72 adjacent to it in FIG. 9, converts it to serial format, and transmits it along with the logical layer framing patterns. It will always pull packets from the highest priority buffers in the queuing buffer 72 before pulling packets from the lower priority buffers. Not shown in the block diagram in FIG. 9 are such items as loopback mechanisms which are used for connection and Built In Test (BIT) of the port. The RFD 66 and TPT 71 work closely together to verify link integrity and provide test features.

Inter Connecting FPGA—The ICF 20 includes the following blocks: Holding Buffers 68, 75; Switching Engines 69; Central Processor Unit 73; Datagram Receiver 74; Datagram Transmitter 75; Dual Datagram Receiver (DDgR) 77; and Dual Datagram Transmitter (DDgT) 78. Most of the blocks, in at least one embodiment, are the same types found in the TPF 19. The last two blocks, the DDgR 77 and the DDgT 78 are slightly different than the single link DgR 74 and DgT 75, respectively.

Figure 10:
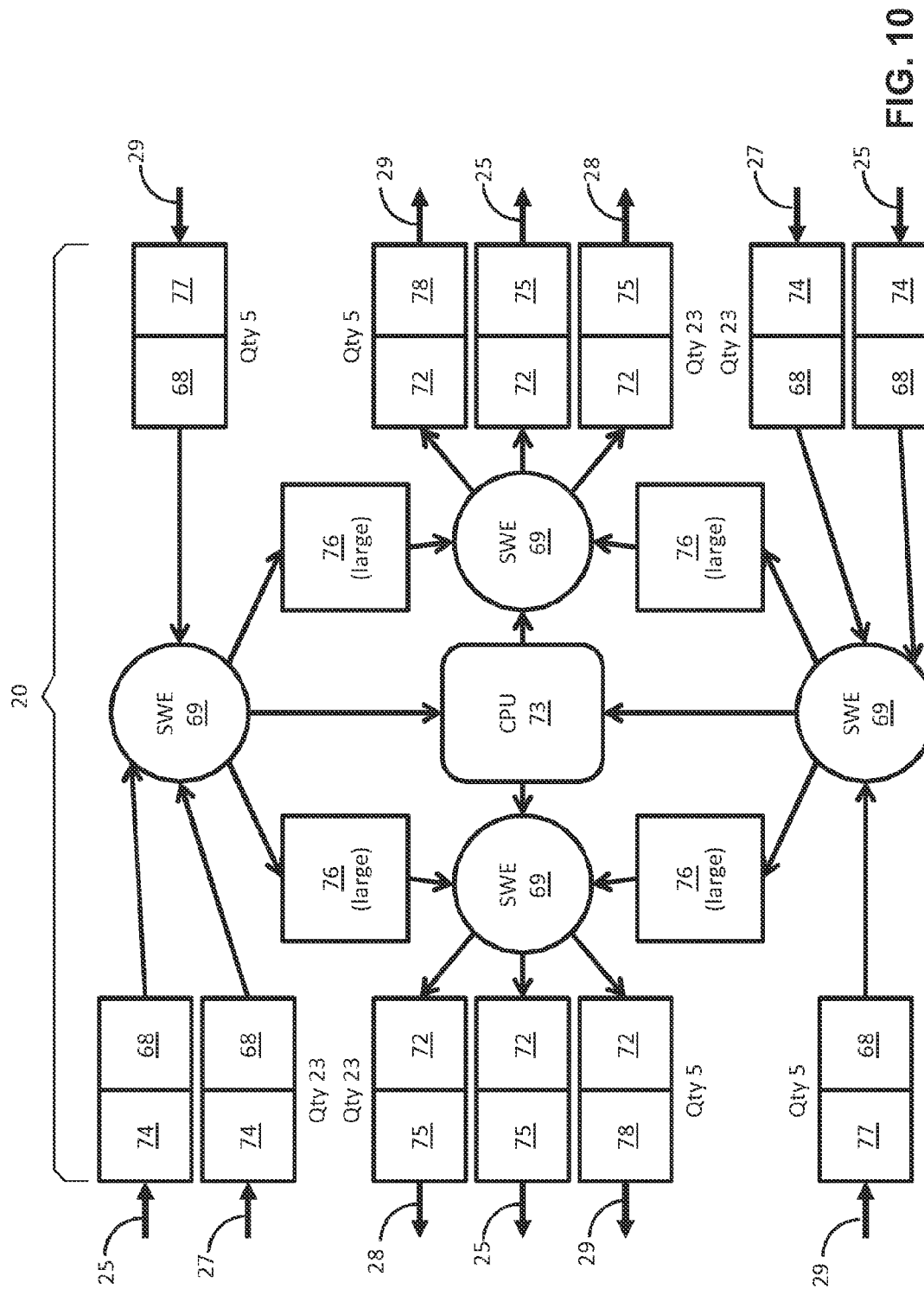
FIG. 10 depicts an embodiment of Data Paths and Functional Blocks Inside an Inter-Connecting FPGA.

Inter Connecting FPGA Architecture—The ICF 20 architecture is arranged as shown in FIG. 10. As the name of the ICF 20 implies, it inter-connects traffic sources together. Datagrams will enter the ICF 20 through either an LVDS port 25, a single link port 27, or a redundant link port 29. The SWE 69 on the top or bottom will route the datagrams to either of the two large Holding Buffers 76 attached to its egress points or to the embedded CPU 73. Each large Holding Buffer 76 is directed to a 2nd SWE 69 whose egress points are the outgoing high speed links 25, 28, 29 of the ICF 20. Datagrams into and out of the embedded CPU 73 are similarly routed.

Due to the amount of traffic that passes through the ICF 20 one SWE 69 was not large enough to handle it. By splitting the incoming traffic up among two SWE 69 there is sufficient bandwidth to pass traffic through the ICF 20. The architecture shown in FIG. 10 is symmetrical, both vertically and/or horizontally. As there are only three possible egress points on the two SWE 69 at the top and bottom of FIG. 10, the egress points of the two SWE 69 in the middle are also identified by the DgR 74 or DDgR 77 and passed through the large queuing buffers 76. RF 62/VP 65 substitution does not take place at the top or bottom SWE 69 but only at the two middle SWE 69.

The ICF 20 is intended to connect to four TPFs 19 in each of 12 different port card slots 10. One port card slot 10 is the one that its port card 3 is installed in. The other 11 are in different chassis 1 in the same port card slot 10 position on each chassis it is in. The ICF 20 has two blocks that are not found in the TPF 19: they are the DDgR 77 and the DDgT 78.

Dual Redundant Links—There are ten sets of Dual Redundant Links 29 on the ICF 20. Each Dual Redundant Link 29 consists of two different high speed serial links 31. The concept behind these links 29, 31 is that identical information is transmitted over both and identical information should be received on them. One link 31 goes to half of a redundant copy of another card such as the CMPI 4, and the other link 31 goes to the other redundant half of that same card. A reason for having these links is if one of the redundant cards fail, the other one can carry the entire datagram transfer load so that the chassis 1 and switch 80 maintain full operational capability.

Dual Datagram Receiver—The DDgR 77 is designed to receive two different high speed serial links 29, 31. Each link 31 comes from a redundant half of a CMPI 4. The DDgR 77 will be synchronized to both links 29, 31 but will only accept user traffic bearing datagrams from one of them. The user traffic bearing datagrams from the other link are a duplicate copy and are not used. If one of the two links 29, 31 fail, the DDgR will automatically accept all datagrams from the other link 31. If both links 29, 31 are working, the DDgR will select whichever one sync'd up first and continue using that link 31 until it is either instructed to switch to the other link 31 or if the link 31 fails. To allow the CMP 5 to communicate with the embedded CPUs 73 in both duplicated halves of the redundant cards connected to the redundant links 29, 31, the management datagrams (PF 50 is 000) of both links 31 of the redundant pair 29 are passed through the DDgR 77.

Dual Datagram Transmitter—The DDgT 78 is the same as a single link DgT 75 except that it feeds identical information to two different links 29, 31. One link 31 goes to one CMPI 4 or similar duplicated card, the other link goes to that card's redundant mate.

CMP Interface FPGA—The CIF 30 includes the following blocks: Holding and Queuing Buffers 68, 72, 75; Switching Engines 69; Central Processor Unit 73; Datagram Receiver 74; Datagram Transmitter 75; and PCI Express Interface (PCIeI) 79. The PCIeI 79 is the only block present in the CIF 30 that is not present in either of the other two FPGAs 19, 20.

Figure 11:
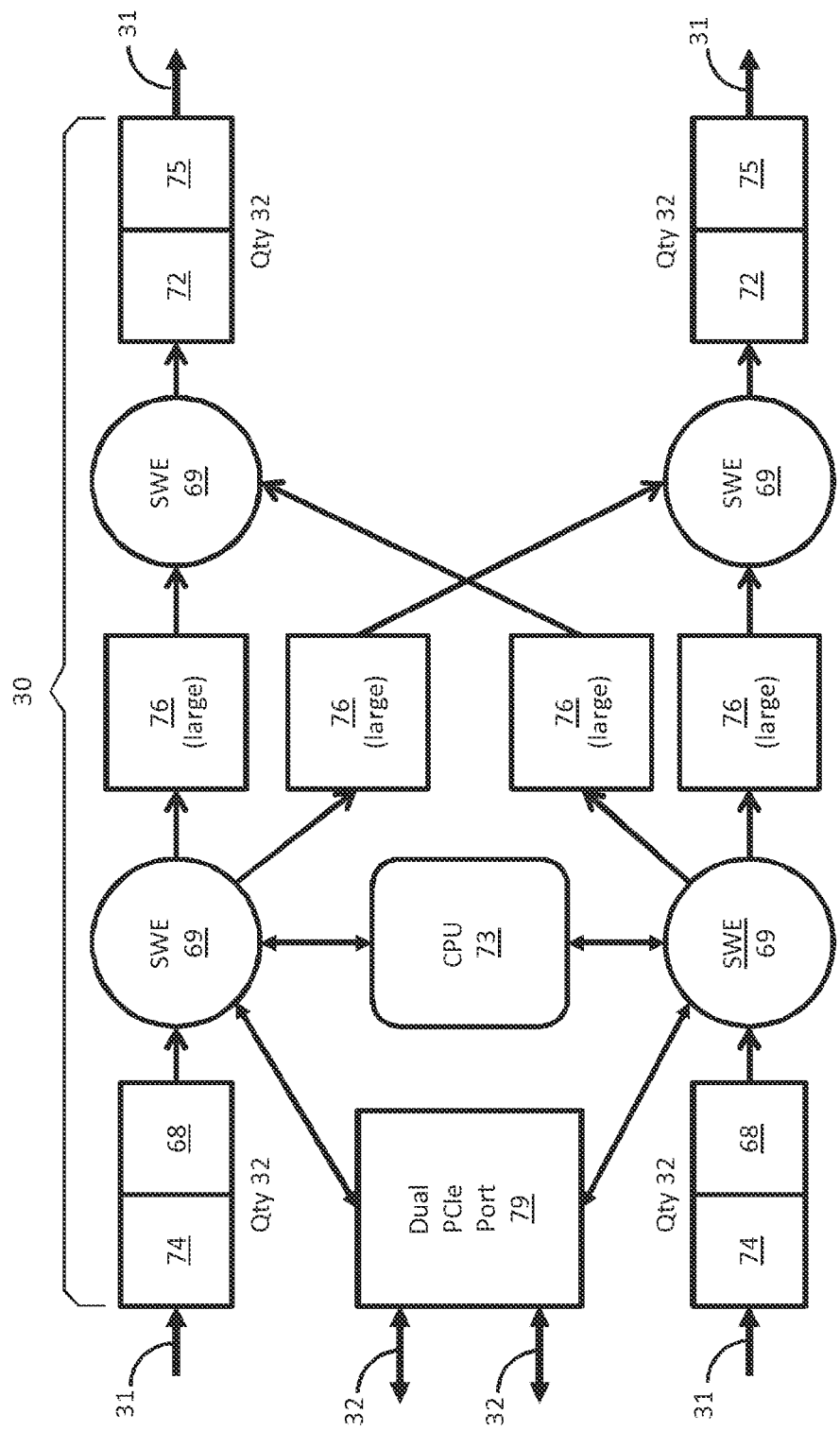
FIG. 11 depicts an embodiment of Data Paths and Functional Blocks inside a Chassis Management Processor Interface FPGA.

CMP Interface FPGA Block Diagram—The CIF 30 block diagram is found in FIG. 11. As the name implies, the CIF 30 provides the interface, or in-band connection, between the CMP 5 and the user data paths inside the chassis 1. Traffic flows into the CIF 30 on the left, where it will get switched to either the PCIeI 79 or one of two large Holding Buffers 76. Incoming traffic is never from a CMP 5 so traffic will not flow from the incoming link 31 into the embedded CPU 73. User traffic, after entering one of the two large Holding Buffers 76 on the egress point of the first SWE 69 will go to the outgoing SWE 69 where it gets switched to one or more of its egress points for transmission back to an ICF 20 in one of the thirty two different port card slots 10. CMP 5 management traffic will enter the CIF 30 through the PCIeI 79 and get switched either to one of the outgoing SWEs 69 through the large Holding Buffer 76 or else it will go to the CIF's 30 embedded CPU 73.

Management traffic back to the CMP 5, including incoming packets that are not recognized, will come into the CIF 30 and get routed to the PCIeI 79 for address resolution by the CMP 5. The CMP 5 will typically work with an SMP 46 to determine how to route an unknown incoming packet through all the chassis 1 of the switch 80.

PCIe Interface Block—The PCIeI 79 is a First In First Out (FIFO) memory with a 64 byte address space, enough to hold every byte of a datagram. The FIFO concept is used as multiple datagrams may reach the PCIeI 79 before the CMP 5 has a chance to read them. A FIFO isn't needed when transmitting datagrams into the chassis 1 as the CMP 5 can wait until the datagram it just wrote out has been transmitted by checking a status bit.

Management traffic written by the CMP 5 to the PCIeI 79 will generate a series of datagrams destined for the embedded CPUs 73 of the various FPGAs 19, 20, 30 located through the chassis 1. These datagrams can be instructions to send back to the CMP 5 the contents of certain control memories, traffic counters, or to modify the control memories. Modifying the control memories in each FPGA 19, 20, 30 is how the chassis 1 routes packets around as datagrams.

Due to the nature of datagram routing, it is possible to route a datagram through the chassis 1 without utilizing any of the control memory. PAR-Only routing enables the CMP 5 to initialize a chassis 1 with no connection information in it. This mechanism also enables the CMP 5 and the SMP 46 to get a good understanding of the organization of a chassis 1 and what cards are installed in each slot in the chassis 1. PAR-Only routing is done using addresses in the AF 51 and the various next address fields 52, 53, 54, 55 of the datagram to get a packet to the embedded CPU 73 of each FPGA 19, 20, 30 in the chassis without having to resort to control memory to help route the datagram. As long as the datagram does need to be duplicated, or have its RF 62 modified, it can pass through the chassis 1 using PAR-Only routing.

FPGA Functional Blocks Specifications—The architectural details of the individual blocks inside the FPGAs 19, 20, 30 are described in the following.

Receiver Framer Deserializer—The RFD 66 is the receiver section of a high speed link 26 dedicated to a port. It can be configured for the particular protocol the port card 3 uses. Altera currently has pre-defined code to configure the link 26 for 10 GbE, 40 GbE, 100 GbE, and OC-192c carrying ATM, as well as interleaving four OC-192c into a single OC-768 signal. Other protocols may be available. The RFD 66 will receive the serial data stream, extract the framing layer, and convert to parallel format the incoming data from the link 26. It will then transfer the received data to the PLE 67 for identification.

Packet Lookup Engine—The PLE 67 identifies the received packet. For ATM, this is a simple process. The VP 65 field addresses a 4096 entry lookup table in control memory. The table will contain information that recognizes the ATM cell so it can be passed through the chassis 1 or else it will have the cell forwarded to the CMP 5 for address resolution. The CMP 5 initializes the lookup table.

For IP, the process is a little more complicated. The packet's destination address (32 bits for IPv4, or the upper 64 bits for IPv6) is passed through a binary search engine to search for a match. The search engine is a series of 64 deep memories that are checked in parallel. Addresses stored in these memories are sorted in some sort of ascending or descending order. In the Altera Stratix 5 series, the search engine and memories are composed of MLAB blocks. Seven blocks are needed to store an entire address of 64 bits (each MLAB is 10 bits wide). They will require 7 searches, and 21 clock periods (running at 600 Mhz) to search all 64 locations of each memory. It will require 64 such sets of MLABs to provide 4096 different addresses to be stored in them. A match in any of the 64 sets of MLABs will result in a recognized packet. Up to three different destination addresses can be concurrently searched through the use of interleaving, so while an actual search may take longer than the reception time of a IP packet, it will be finished before two more such packets are received, freeing up one of the three searching mechanisms for the next received IP packet.

If sufficient resources are available in the TPF 19, additional MLABs may be assigned to the PLE 67 to increase the number of IP addresses the port can recognize IPv4 Packets can arrive no faster than once every 22.4 nS on a 10 GbE port. It takes up to 35 nS to search through the MLABs looking for a match. Since the MLAB is accessed once every three clocks during the lookup process, up to three packet lookup processes can run, interleaved, concurrently looking for IP packets. The PLE 67 will therefore need to be able to buffer as many minimally size IP packets as needed to hold the packet long enough to find a match.

When a match is found for IP packets, ATM cells, or any other protocol, the routing information is used to generate the first or only datagram of the packet, and the packet is passed through the chassis 1, or if the CMP 5 has previously rejected the packet, it is dropped at the PLE 67. If no match is found, the packet is passed to the CMP 5 for address resolution.

Holding Buffers and Queuing Buffers—Buffers 68, 72, 76 are needed as temporary storage of packets since the incoming rate into the buffer occasionally will exceed the outgoing rate. Buffers are also used to collect all the datagrams of a multi-datagram packet before passing them to the output. There are instances where a multi-datagram packet needs to be discarded such as a mis-sequencing of the modulo 64 counter 68. When this happens the datagrams of the packet already stored in the buffer are ignored and the pointer indicating the next available slot for storing datagrams goes back to the beginning of the packet. This way the packet is discarded before being presented to the egress port of the buffer 68, 72, 76.

Queuing buffers 72 are special versions of the holding buffer 68, with three logical buffers are built into it. One buffer holds the highest priority traffic and is relatively small to minimizing queuing delays. A second buffer of similar size is used to hold near-real time data. Like the high priority buffer, its size is kept small to keep queuing delays down to a minimum. When the TPT 71, DgT 75, or DDgT 78 does a search of all the buffers in the queuing buffer 72, it first goes to the highest priority buffer, then the second highest priority, and then the non-real time buffer. Due to the ease with which the smaller, higher priority buffers can be overrun, it is the responsibility of the CMP 5 and SMP 46 to carefully regulate how much high priority traffic flows through these buffers.

The balance of the queuing buffer 72 is dedicated to carrying non-real time traffic. Non-real time traffic has two priorities inside the chassis 1. When the buffer is about three fourths full, it will not accept any more low priority non-real time traffic until it is no more than half full again. The actual thresholds will be determined by simulations of traffic patterns. This allows customers who are paying for their traffic a higher chance that it will get through the chassis 1 and switch 80 during congestion.

Switching Engine—The SWE 69 is the heart of switching datagrams throughout the chassis 1. Multiple instances are in each FPGA 19, 20, 30 in the implementation. The SWE 69 will use a round-robin scheme of polling each ingress point to see if it has a packet (either an only datagram or a multi-datagram packet) to be switched. Except for those SWE 69 with only a few egress points (as seen in the TPF 19 or CIF 30), the incoming datagram will contain a flag for every egress point of the SWE 69 the datagram is to be copied to as it leaves the SWE 69. Due to the fact that a multi-datagram packet only has routing information in the first datagram, the egress point flags are held in a latch until the last datagram of a multi-datagram packet passes through.

A second flag associated with each egress point will inform a 4096×12 memory on the egress point to replace the RF 62/VP 65 field of the datagram with a new 12 bit value. The SWE 69 is a large N:1 multiplexer (N inputs or ingress points going to 1 output) wide enough to switch every bit of a datagram concurrently. It has N number of ingress points and multiplexes them down to a single output. The width of the multiplexer (the number of bits switched in a single clock cycle) is equal to the number of bits in the datagram plus the overhead bits that identify the egress point(s) of the SWE 69 and whether or not the datagrams RF 62/VP 65 are to be replaced. This output feeds all the egress points of the SWE 69. Those egress points who acceptance flag is set will accept the datagram.

Packet Reassembly Engine—The PRE 70 will accept, at the speed the SWE 69 can feed it, the datagrams of a packet and re-assemble the packet into a continuous set of bytes. It then stores the re-assembled packet in a queuing buffer 72 until the TPT 71 is ready to accept it.

Telecom Port Transmitter—The TPT 71 pulls a single packet out of a queuing buffer 72, frames it with the line protocol's framing algorithm, and transmits it as a high speed differential signal. The signal will leave the TPF 19 and go to specialized hardware that converts the high speed differential signal 26 into the physical layer protocol of the data port. The specialized hardware will reside in a QSFP or other interface on the front of the card.

Datagram Receiver and Transmitter—All internal traffic in the chassis 1 is passed between FPGAs 19, 20, 30 in datagrams. Using Altera's Serial Lite II or Interlaken, datagram transmission and reception is very easy to accomplish. An inter-datagram marker is used to separate datagrams in the serial datastream between FPGAs 19, 20, 30. Once a datagram transmission begins it is not interrupted. Once a multi-datagram transmission beings it is not interrupted. The DgR 74 is similar to the RFD 66 but simpler. The datagram has built into it small fields to route itself through the SWE 69 of the FPGA 19, 20, 30, or to utilize the control memories located at each DgR 74. This simplifies the routing of the datagram and identifying it at the receiver of the serial link. The DgT 75 is similar to the TPT 71. It pulls datagrams one at a time from the queuing buffer 72 and encapsulates them around the Serial Lite II or Interlaken protocol, then transmits them at the serial link transmitter.

Dual Datagram Receiver—The DDgR 77 is two DgR 74 with a 2:1 multiplexer that selects datagrams from one or the other receiver. When both are receiving valid datagrams, the DDgR 77 can automatically select either link. If one link stops receiving datagrams, the DDgR 77 will switch over to the functioning link. Or the DDgR 77 can be commanded to select one link over the other by the CMP 5. When switching links the DDgR will try to switch on datagram boundaries. Note that management datagrams are not ignored but are passed through from both receivers of the DDgR 77.

Dual Datagram Transmitter—The DDgT 78 is two DgT 75 which transmit the same datagrams from the same queuing buffer 72.

PCI Express Interface—The PCIeI 79 is used to connect the CMP 5 to the internal network where user traffic flows through the chassis 1. The PCIeI 79 is a FIFO buffer that is addressable by either CMP 5. One buffer is read from and is used to read management traffic from the embedded CPUs 73 or unrecognized packets from the TPF 19. There is also a write buffer for sending management traffic out to the embedded CPUs 73 of the FPGAs. Due to the CMP's 5 ability to read the empty/full status of this buffer, it does not need to be a FIFO.

Card Support—Inter-Processor Management Interface—IPMI is a protocol that manages low level operating functions on printed circuit assemblies. As envisioned in use on this application, it monitors incoming voltages and currents, card temperature at various spots (most FPGAs have temperature sensing diodes built into them that can be managed by IPMI Processors 16), and generated voltages and currents by the on-card switching power supplies. Actel Corporation makes a series of FPGAs with analog circuits for measuring voltages and currents, and are designed to work with IPMI, such as the M1AFS600.

Power Distribution—Main Power Buses—There are two power buses 22, 23 throughout each chassis for the distribution of 12V (14.5V to 10.5V) power. The voltage range specified is the range most six cell lead-acid or gel-cell batteries will work in. Below 10.5V they exhaust so rapidly that any additional run time achieved by going lower is not cost effective to implement if additional costs are needed. The upper range is achieved when battery chargers are put into 'equalize' mode where they are overcharged to stir up fluids inside lead-acid batteries that are not gel-cells. This stirring of the fluids prevents settling and layering of the different chemicals inside a liquid chemistry lead-acid battery.

There are multiple sets of power converters that provide the distributed, low voltage high current power needed by the FPGAs 19, 20, 30. Each converter is input current limited so that if it fails in a shorted state the current limit will kick in and keep the shorted device from bringing down the power bus 22, 23. The IPMI Processor 16 on the card will detect the current limiting feature kicking in and shut it off completely to keep it from overheating. The current limiting circuits can be individually tested by shorting a resistor to ground that will pull more current than the current limiting value is set to. The voltage drop to the converter downstream from the current limiting feature will see reduced voltage as a result, as will the IPMI Processor 16.

Distributed Power—Each card has multiple sources of power 22, 23 to supply its various voltages. If any one power source fails, it will shut off and the redundant power source will provide full capacity to the card. The IPMI Processor 16 will notice this and report this to the CMP 5. During the next maintenance interval a craftsperson can remove and replace the card.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A packet-data switching system, the system comprising:
    a plurality of interconnecting switching nodes, each node having an embedded processor and a plurality of physical ports; and
    a switch management processor for managing the plurality of switching nodes;
    wherein each switching node is configured to receive a data packet at one of the plurality of ports and to process the data packet;
    wherein processing the data packet includes at least one of:
        routing the data packet to another of the plurality of ports of the switching node for egress from the switching system;
        routing the data packet to another of the plurality of switching nodes;
        routing the data packet to the embedded processor; and
        routing the data packet to the switch management processor;
    wherein processing the data packet includes identifying, as switching system ingress data packets, data packets that are entering the switching system and wherein processing a switching system ingress data packet includes:
        identifying, as the ingress node, the switching node via which the data packet entered the switching system;
        determining a destination of the data packet;
        using the destination to identify, as the egress node, a switching node via which the data packet will exit the switching system;
        determining a path from the ingress node to the egress node, the path including at least one switching node;
        determining, for each of the at least one switching node in the path, a physical address of an egress port for transmitting the data packet to the next step in the path;
        representing the path as a list of the at least one egress port, in the order of the switching nodes that the data packet will encounter on its way to the egress port of the egress node, wherein the egress port of the egress node is at the back of the list;
        modifying the data packet header to include the list of egress ports; and
        routing the data packet through the switching system using the list of egress ports, wherein at the egress node, the data packet header is restored to its original condition before the data packet egresses the switching system.

2. The system of claim 1 wherein routing the data packet through the system using the list of egress ports includes, at each switching node in the path:
    receiving the data packet and identifying the list of egress ports contained within the received data packet;
    reading the value of the entry at the front of the list of egress ports; and
    determining whether the value identifies an egress port of the switching node;
    wherein, upon a determination that the value identifies an egress port of the switching node, the switching node modifies the data packet by removing the egress port from the front of the list by shifting the members of the list forward by one position and putting a filler value into the back-most position of the list, routes the data packet internally within the switching node to its own egress port so identified, and transmits the data packet from the switching node via the identified egress port.

3. The system of claim 2 wherein, upon a determination that the value does not identify an egress port of the switching node, the switching node determines whether the value is a filler value, and, upon a determination that the value is a filler value, the switching node performs at least one of:
    discards the data packet;
    reroutes the data packet to storage;
    performs an analysis of the data packet; and
    issues a notification.

4. The system of claim 3 wherein, upon a determination that the value is not a filler value, the switching node routes the data packet to an internal processor of switching node.

5. The system of claim 1 wherein determining the path from the ingress node to the egress node includes:
   determining whether the path from the ingress node to the egress node has already been calculated;
   in response to determining that the path from the ingress node to the egress node has not been calculated, requesting the switch management processor to calculate the path, receiving the calculated path from the switch management processor, storing the calculated path, and using the newly calculated path; and
   in response to determining that the path from the ingress node to the egress node has already been calculated, using the already calculated path.

6. The system of claim 1 wherein determining the path from the ingress node to the egress node includes requesting the switch management processor to calculate the path, receiving the calculated path from the switch management processor, and using the newly calculated path.

7. The system of claim 1 wherein modifying the data packet header to include the list of egress ports includes:
   prefixing the list of egress ports to the front of the data packet;
   enclosing the data packet within a wrapper having a header that includes the list of egress ports; or
   inserting the data packet within a new data packet having a header that includes the list of egress ports.

8. The system of claim 1 wherein modifying the data packet header to include the list of egress ports includes padding the back of the list until the list is a predetermined length.

9. The system of claim 1 comprising a plurality of data paths for connecting each port to a plurality of other ports.

10. The system of claim 9 wherein determining the path from the ingress node to the egress node includes selecting a path from a plurality of available paths through the switching system.

11. The system of claim 10 wherein selecting a path from a plurality of available paths includes selecting the path according to a load-balancing algorithm.

12. The system of claim 1 wherein processing a data packet includes discarding the data packet.

13. The system of claim 1 wherein processing a data packet includes generating a new packet.

14. The system of claim 13 wherein the new packet:
   is a duplicate of the processed packet;
   includes an output of the embedded processor; or
   includes an output of the switch management processor.

15. The system of claim 13 wherein the new packet is routed to a destination that is different from the destination of the received packet.

16. The system of claim 1 wherein processing the data packet includes converting the data packet from a serial data format to a parallel data format prior to routing the data packet through the switching system.

17. The system of claim 16 wherein processing the data packet further includes converting the data packet from a parallel data format to a serial data packet prior to egress of the packet from the switching system.

18. The system of claim 1 wherein at least one hardware element within the switching system is configured as a failover element.

19. The system of claim 1 wherein processing a packet includes segmenting the packet into a leading packet, zero or more continuation packets, and a final packet.

20. The system of claim 19 wherein the zero or more continuation packets and the final packet do not include the list of egress ports and wherein the leading packet, zero or more continuation packets, and final packet are routed through the switching system consecutively without intervening packets.

* * * * *